US011285782B2

(12) United States Patent
Aikawa

(10) Patent No.: US 11,285,782 B2
(45) Date of Patent: Mar. 29, 2022

(54) COOLING SYSTEM

(71) Applicant: TOYOTA JIDOSHA KABUSHIKI KAISHA, Toyota (JP)

(72) Inventor: Hidefumi Aikawa, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 68 days.

(21) Appl. No.: 17/017,817

(22) Filed: Sep. 11, 2020

(65) Prior Publication Data

US 2021/0094390 A1 Apr. 1, 2021

(30) Foreign Application Priority Data

Sep. 30, 2019 (JP) .............................. JP2019-179696

(51) Int. Cl.
*B60H 1/32* (2006.01)
*B60H 1/06* (2006.01)
*B60H 1/00* (2006.01)

(52) U.S. Cl.
CPC ........... *B60H 1/06* (2013.01); *B60H 1/00278* (2013.01); *B60H 1/00392* (2013.01); *B60H 1/00885* (2013.01); *B60H 1/3227* (2013.01); *B60H 1/32284* (2019.05); *B60H 2001/00928* (2013.01); *B60H 2001/00942* (2013.01)

(58) Field of Classification Search
CPC .. B60H 1/06; B60H 1/32284; B60H 1/00278; B60H 1/00392; B60H 1/00885; B60H 1/3227; B60H 2001/00928; B60H 2001/00942

USPC .......................................................... 62/239
See application file for complete search history.

(56) References Cited

U.S. PATENT DOCUMENTS

| | | | |
|---|---|---|---|
| 6,260,766 B1* | 7/2001 | Morikawa | B60H 1/03 122/26 |
| 2014/0251239 A1* | 9/2014 | Richards | F02B 29/0493 123/41.05 |
| 2018/0361825 A1* | 12/2018 | Porras | B60H 1/00385 |
| 2020/0164718 A1* | 5/2020 | Takei | B60L 58/26 |

FOREIGN PATENT DOCUMENTS

| JP | 2019-034587 A | 3/2019 |
|---|---|---|
| JP | 2019-043262 A | 3/2019 |

* cited by examiner

*Primary Examiner* — Davis D Hwu
(74) *Attorney, Agent, or Firm* — Oliff PLC

(57) ABSTRACT

A cooling system mounted in a vehicle includes a radiator exchanging heat with the outside air; first and second flow paths; and a control device. The first path is configured so that when the first pump is operating, a heat medium circulates through the radiator and a first heat exchanger exchanging heat with the inverter. The second flow path is connected to the radiator in parallel with the first flow path, and is configured so that when the second pump is operating, the heat medium circulates through the radiator and a second heat exchanger exchanging heat with the battery. The control device controls the outputs of the first and second pumps so that when making both of the outputs rise or fall, the flow rate of the heat medium flowing through the first flow path becomes temporarily larger than the target flow rate.

9 Claims, 14 Drawing Sheets

COOLING SYSTEM

FIELD

The present disclosure relates to a cooling system.

BACKGROUND

Known since the past has been a cooling system for cooling an inverter and a battery connected to a motor for driving a vehicle (for example, PTL 1). In particular, the cooling system described in PTL 1 is provided with a first flow path connected to a radiator and having a heat exchanger for inverter and a first pump, and a second flow path connected to the same radiator in parallel with the first flow path and having a heat exchanger for battery and a second pump.

CITATIONS LIST

Patent Literature

[PTL 1] Japanese Unexamined Patent Publication No. 2019-034587

SUMMARY

In the cooling system described in PTL 1, the first flow path and second flow path are connected in parallel to a radiator. For this reason, if changing the output of one pump, not only the flow rate of the heat medium flowing through the flow path at which the pump is provided, but also the flow rate of the heat medium flowing through the other flow path changes.

Here, an inverter rapidly generates heat according to the load of the motor. Along with this, sometimes the temperature rapidly rises. To prevent the inverter from breaking down even if the inverter rapidly generates heat in this way, it is necessary to make a heat medium constantly flow equal to or greater than a certain flow rate to the heat exchanger for inverter.

In this regard, however, in the above cooling system, the flow rate of the heat medium flowing through the first flow path changes not only due to the output of the first pump at which the inverter is provided, but also due to the output of the second pump. For this reason, in particular, when changing the output of these pumps, sometimes the flow rate of the heat medium flowing through the first flow path excessively decreases. As a result, in such a case, if the inverter rapidly generates heat, a temperature of the inverter may be liable to rise excessively.

In consideration of the above problem, an object of the present disclosure is to provide a cooling system able to suppress an excessive rise in temperature of an inverter.

The present invention was made so as to solve the above problem and has as its gist the following.

(1) A cooling system mounted in a vehicle provided with a motor for driving the vehicle, an inverter for controlling the motor, and a battery for supplying electric power to the motor, the cooling system comprising:
  a radiator exchanging heat with the outside air;
  a first flow path connected to the radiator and having a first pump and a first heat exchanger exchanging heat with the inverter, wherein when the first pump is operating, a heat medium circulates through the radiator and the first heat exchanger;
  a second flow path connected to the radiator in parallel with the first flow path and having a second pump and a second heat exchanger exchanging heat with the battery, wherein when the second pump is operating, the heat medium circulates through the radiator and the second heat exchanger; and
  a control device controlling operations of the first pump and the second pump,
  wherein the control device controls the outputs of the first pump and the second pump so that when making the outputs of the first pump and the second pump both rise or when making the outputs of the first pump and the second pump both fall, the flow rate of the heat medium flowing through the first flow path becomes temporarily larger than the target flow rate.

(2) The cooling system according to above (1), wherein when making the outputs of the first pump and the second pump both rise, the control device raises the output of the first pump before raising the output of the second pump.

(3) The cooling system according to above (1) or (2), wherein when making the outputs of the first pump and the second pump both rise, the control device controls the outputs of the first pump and the second pump so that a rate of rise of the output of the first pump becomes faster than a rate of rise of the output of the second pump.

(4) The cooling system according to any one of above (1) to (3), wherein when making the outputs of the first pump and the second pump both fall, the control device lowers the output of the second pump before lowering the output of the first pump.

(5) The cooling system according to any one of above (1) to (4), wherein when making the outputs of the first pump and the second pump both fall, the control device controls the outputs of the first pump and the second pump so that a rate of fall of the output of the second pump becomes faster than a rate of fall of the output of the first pump.

(6) The cooling system according to any one of above (1) to (5), wherein
  the system further comprises a refrigeration circuit having a third heat exchanger making the refrigerant absorb heat to thereby make the refrigerant evaporate and cool the heat medium and configured so that the refrigerant circulates through the third heat exchanger to thereby realize a refrigeration cycle, and
  the second flow path further has a third heat exchanger, and the second flow path is configured so that, when the second pump is operating, the heat medium circulates through the radiator, the second heat exchanger, and the third heat exchanger.

(7) The cooling system according to any one of above (1) to (6), wherein the control device sets the output of the first pump based on the target flow rate of the heat medium at the first flow path and the target flow rate of the heat medium at the second flow path, and sets the output of the second pump based on the target flow rate of the heat medium at the first flow path and the target flow rate of the heat medium at the second flow path.

(8) The cooling system according to above (7), wherein the control device calculates the target flow rate of the heat medium at the first flow path, based on the temperature of the element of the inverter and the temperature of the heat medium flowing through the first flow path.

(9) The cooling system according to above (7) or (8), wherein the control device calculates the target flow rate of the heat medium at the second flow path, based on the temperature of the element of the battery and the temperature of the heat medium flowing through the second flow path.

According to the present disclosure, a cooling system able to suppress an excessive rise in temperature of an inverter is provided.

DESCRIPTION OF EMBODIMENTS

Figure 1:
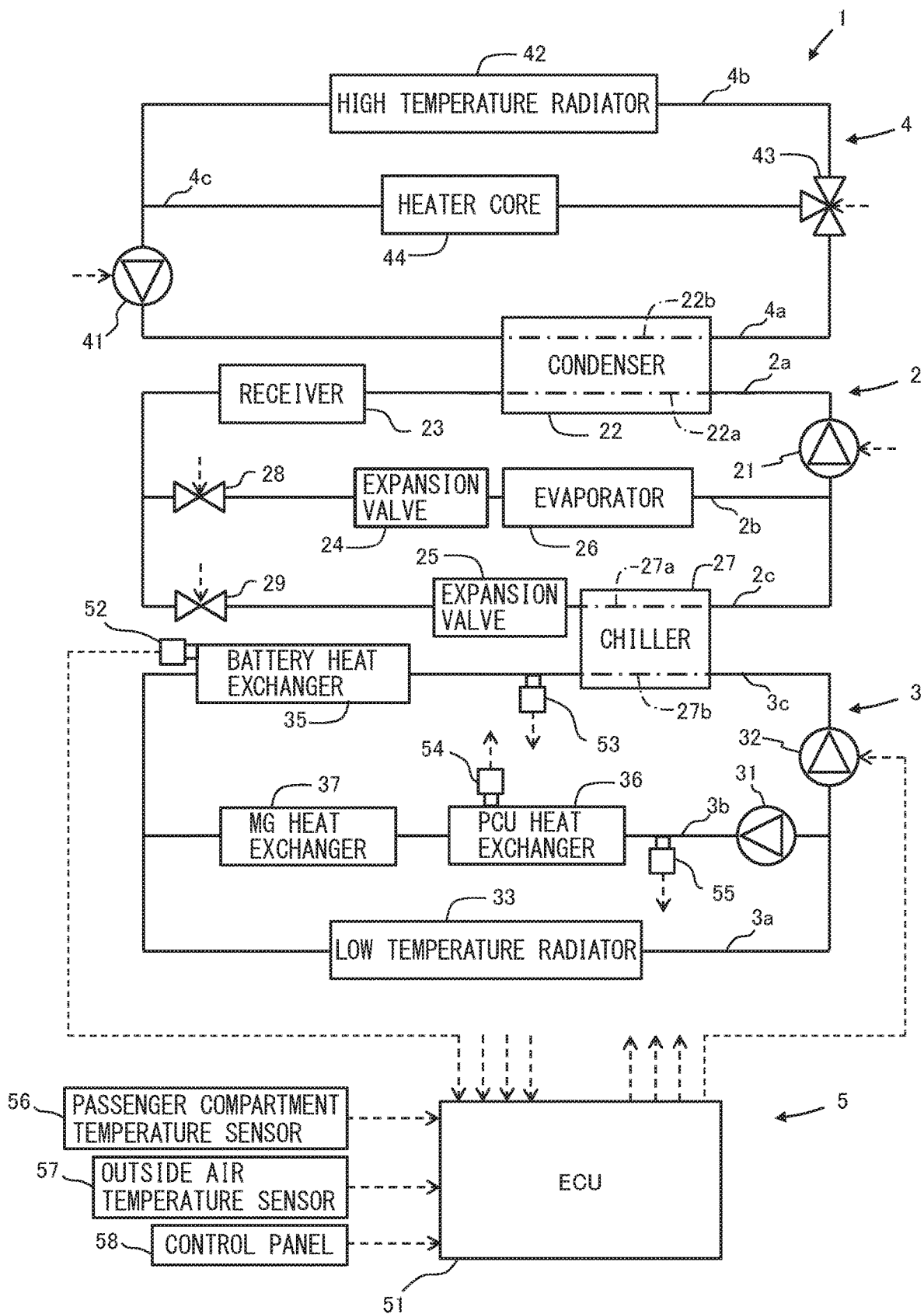
FIG. 1 is a view schematically showing the configuration of a vehicle-mounted temperature controller mounting a cooling system according to one embodiment.

Below, referring to the drawings, embodiments will be explained in detail. Note that, in the following explanation, similar components are assigned the same reference signs.

First Embodiment

Configuration of Vehicle-Mounted Temperature Controller

Figure 2:
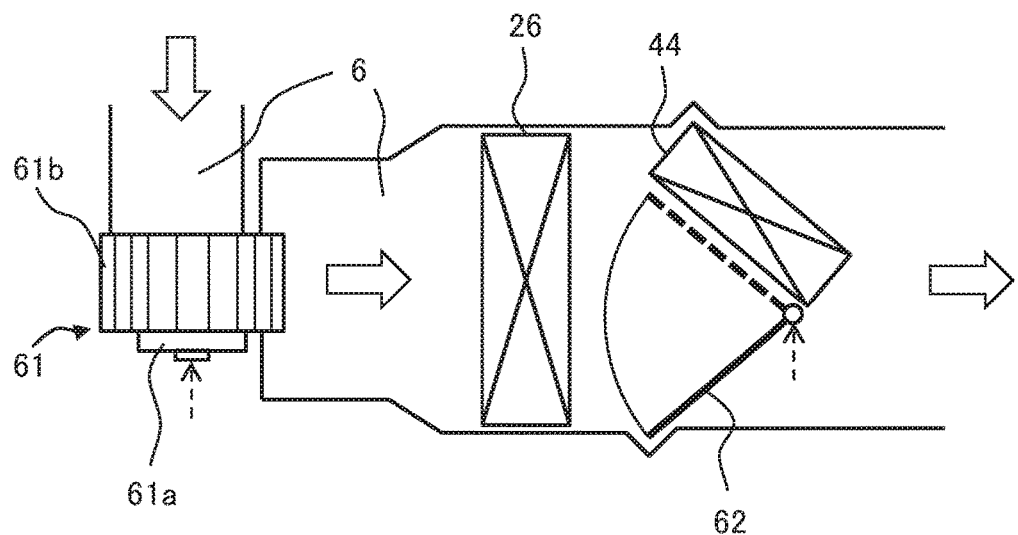
FIG. 2 is a view schematically showing the configuration of an air passage for air-conditioning of a vehicle mounting a vehicle-mounted temperature controller.
Figure 3:
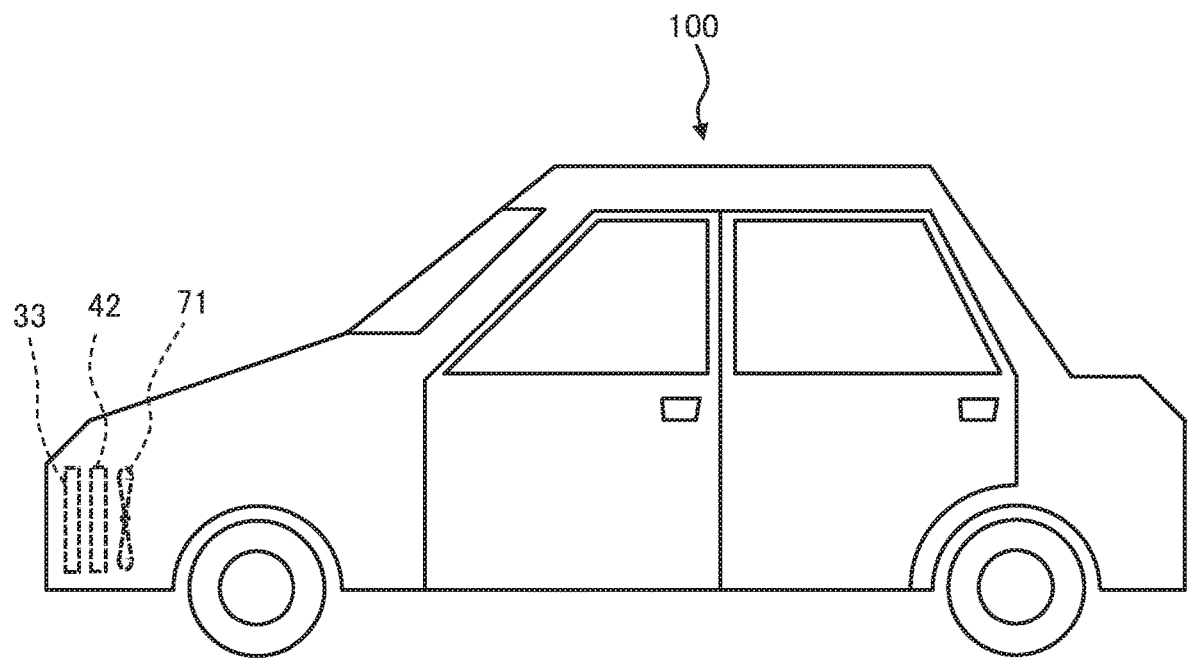
FIG. 3 is a view schematically showing a vehicle mounting a vehicle-mounted temperature controller.

Referring to FIGS. 1 to 3, the configuration of a vehicle-mounted temperature controller 1 mounting a cooling system according to the first embodiment will be explained. FIG. 1 is a view of the configuration schematically showing the vehicle-mounted temperature controller 1. In the present embodiment, the vehicle-mounted temperature controller 1 is particularly mounted in an electric vehicle driven by a motor or in a hybrid vehicle driven by a motor and an internal combustion engine. Therefore, the vehicle 100 (see FIG. 3) is provided with a motor-generator (MG), power control unit (PCU) controlling the MG, and battery supplying electric power to the MG (all not shown).

The MG is used to drive the vehicle 100 or regenerate power when braking the vehicle 100. Note that, in the present embodiment, the MG having an electrical power generating function is used as the motor driving the vehicle 100, but a motor not having an electrical power generating function may also be used.

The PCU is connected between the battery and the MG and controls the electric power supplied to the MG. The PCU has an inverter driving the motor, a booster converter controlling the voltage, a DCDC converter lowering the high voltage, and other heat generating components. The battery is connected to the PCU and MG and supplies electric power for driving the vehicle to the MG.

The vehicle-mounted temperature controller 1 includes a refrigeration circuit 2, low temperature circuit 3, high temperature circuit 4, and control device 5.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to realize a refrigeration cycle by circulation of a refrigerant through these components when the compressor 21 is driven. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first solenoid regulating valve 28, the first expansion valve 24, and the evaporator 26 are provided in that order in a direction of circulation of the refrigerant. In addition, at the chiller flow path 2c, the second solenoid regulating valve 29, the second expansion valve 25, and the refrigerant piping 27a of the chiller 27 are provided in that order.

The compressor 21 is functions as a compressor compressing the refrigerant to raise it in temperature. In the present embodiment, the compressor 21 is an electrically driven type, and is configured so that the discharge capacity can be changed steplessly by adjustment of the electric power or duty ratio of the electric power supplied to the compressor 21. In the compressor 21, the mainly gaseous refrigerant with low temperature and low pressure is adiabatically compressed, whereby it is changed to a mainly gaseous refrigerant with high temperature and high pressure.

The condenser 22 is provided with the refrigerant piping 22a and cooling water piping 22b. The condenser 22 functions as a heat exchanger for discharging heat from the refrigerant to the cooling water of the high temperature circuit 4 to cause the refrigerant to condense. Further, the refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. The first expansion valve 24 and the second expansion valve 25 functions as an expander for making the refrigerant expand. These expansion valves 24 and 25 are, for example, provided with small diameter passages, and spray refrigerant from the small diameter passages to make the pressure of the refrigerant rapidly decrease. At these expansion valves 24 and 25, the liquid refrigerant with high temperature and high pressure, flowing out from the receiver 23, is depressurized and partially vaporizes, whereby it is changed to a mist-like refrigerant with low temperature and low pressure.

The evaporator 26 functions as a heat exchanger for absorbing heat from the ambient air to the refrigerant to evaporate the refrigerant. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as a third heat exchanger for making the refrigerant absorb heat from the cooling water of the later explained low temperature circuit 3 to evaporate the refrigerant and cool the cooling water. Further, the refrigerant piping 27a of the chiller 27 functions as an evaporator for making the refrigerant evaporate. At the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2. The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, if possible to adjust the flow rate from the refrigerant basic flow path 2a to the evaporator flow path 2b and the chiller flow path 2c, some sort of valve may also be provided as a circulation mode control device, instead of these solenoid regulating valves 28 and 29.

Next, the low temperature circuit 3 will be explained. The low temperature circuit 3 functions as a cooling system for cooling heat generating equipment, such as the battery, PCU or MG. The low temperature circuit 3 includes a first pump 31, a second pump 32, a cooling water piping 27b of the chiller 27, and a low temperature radiator 32. In addition, the low temperature circuit 3 includes the battery heat exchanger 35, PCU heat exchanger 36, and MG heat exchanger 37. In the low temperature circuit 3, the cooling water circulates through these components Note that, the cooling water is one example of the first heat medium. Inside the low temperature circuit 3, any other heat medium may be used instead of the cooling water.

The low temperature circuit 3 is divided into a low temperature radiator flow path 3a, PCU flow path 3b and battery flow path 3c. The PCU flow path 3b and the battery flow path 3c are respectively connected to the low temperature radiator flow path 3a (i.e., to the low temperature radiator 33 provided in the low temperature radiator flow path 3a) parallel to each other.

The low temperature radiator flow path 3a is provided with a low temperature radiator 33. The PCU flow path 3b is provided with the first pump 31, PCU heat exchanger 36, and MG heat exchanger 37 in the direction of circulation of the cooling water in that order. If the first pump 31 is operated, cooling water circulates through the low temperature radiator 33, PCU heat exchanger 36, and MG heat exchanger 37. Further, the battery flow path 3c is provided with the second pump 32, cooling water piping 27b of the chiller 27, and battery heat exchanger 35 in the direction of circulation of the cooling water in that order. If the second pump 32 is operated, cooling water circulates through the low temperature radiator 33, cooling water pump 27b of the chiller 27, and battery heat exchanger 35. Note that, the PCU flow path 3b and battery flow path 3c may also be provided with heat exchangers exchanging heat with heat generating equipment other than the PCU, MG, and battery.

The first pump 31 and second pump 32 pump the cooling water circulating through the inside of the low temperature circuit 3. In the present embodiment, the first pump 31 and second pump 32 are electrically driven water pumps. They are configured so that their discharge capacities are changed steplessly by the electric power supplied to the first pump 31 and second pump 32 or duty ratio being adjusted.

The low temperature radiator 33 is a heat exchanger exchanging heat between the cooling water circulating through the inside of the low temperature circuit 3 and the air outside of the vehicle 100 (outside air). The low temperature radiator 33 is configured to discharge heat from the cooling water to the outside air, when the temperature of the cooling water is higher than the temperature of the outside air, and to make the cooling water absorb heat from the outside air, when the temperature of the cooling water is lower than the temperature of the outside air.

The battery heat exchanger 35 functions as a second heat exchanger for heat generating equipment exchanging heat between the heat generating equipment of the battery of the vehicle 100 and the cooling water. Specifically, the battery heat exchanger 35 is, for example, provided with piping provided around the battery and is configured so that heat is exchanged between the cooling water flowing through this piping and the battery.

Further, the PCU heat exchanger 36 functions as a first heat exchanger for heat generating equipment exchanging heat between the PCU of the vehicle 100, which is the heat generating equipment, and the cooling water. Specifically, the PCU heat exchanger 36 is provided with piping provided around the PCU and is configured so that heat is exchanged between the cooling water flowing through this piping and the PCU. Note that, the PCU heat exchanger 36 may be configured to exchange heat with some of the parts among the parts forming the PCU (inverter, booster converter, DCDC converter, etc.). In this case as well, the PCU heat exchanger 36 is configured to exchange heat with at least the inverter.

The MG heat exchanger 37 functions as a heat exchanger for heat generating equipment exchanging heat between the heat generating equipment of the MG (or motor) of the vehicle 100 and the cooling water. Specifically, the MG heat exchanger 37 is configured to exchange heat between the oil flowing around the MG and the cooling water.

Next, the high temperature circuit 4 will be explained. The high temperature circuit 4 includes a third pump 41, the cooling water piping 22b of the condenser 22, a high temperature radiator 42, a three-way valve 43, and a heater core 44. In the high temperature circuit 4 as well, the cooling water circulates through these components. Note that, this cooling water is one example of the second heat medium. Inside the high temperature circuit 4, any other heat medium may be used instead of the cooling water.

Further, the high temperature circuit 4 is divided into a high temperature basic flow path 4a, high temperature radiator flow path 4b, and heater flow path 4c. The high temperature radiator flow path 4b and the heater flow path 4c are respectively connected to the high temperature basic flow path 4a, parallel with respect to the high temperature basic flow path 4a.

At the high temperature basic flow path 4a, a third pump 41 and the cooling water piping 22b of the condenser 22 are provided in that order in the direction of circulation of the cooling water. At the high temperature radiator flow path 4b, a high temperature radiator 42 is provided. Further, at the heater flow path 4c, the heater core 44 is provided. A three-way valve 43 is provided between the high temperature basic flow path 4a, and high temperature radiator flow path 4b and the heater flow path 4c.

The third pump 41 pumps the cooling water circulated through the high temperature circuit 4. In the present embodiment, the third pump 41 is an electric type water pump similar to the first pump 31 and second pump 32. Further, the high temperature radiator 42, in the same way as the low temperature radiator 33, is a heat exchanger exchanging heat between the cooling water circulating through the high temperature circuit 4 and the outside air.

The three-way valve 43 functions as a circulation mode control device for controlling the circulation mode of the cooling water flowing out from the cooling water piping 22b of the condenser 22, and is configured to selectively change paths, to which the cooling water flows into, between the high temperature radiator flow path 4b and the heater flow path 4c. If the three-way valve 43 is set at the high temperature radiator flow path 4b side, the cooling water flowing out from the cooling water piping 22b of the condenser 22 flows through the high temperature radiator flow path 4b. On the other hand, if the three-way valve 43 is set at the heater flow path 4c side, the cooling water flowing out from the cooling water piping 22b of the condenser 22 flows through the heater core 44. Note that, if possible to suitably adjust the flow rate of cooling water flowing into the high temperature radiator flow path 4b and heater flow path 4c, an adjusting valve or on-off valve or other circulation mode control device may be used instead of the three-way valve 43.

The heater core 44 is configured to exchange heat between the cooling water circulating through the high temperature circuit 4 and the air surrounding the heater core 44 to thereby heat the passenger compartment. Specifically, the heater core 44 is configured so as to discharge heat from the cooling water to the air surrounding the heater core 44. Therefore, if high temperature cooling water flows to the heater core 44, the temperature of the cooling water is decreased and the air surrounding the heater core 44 is warmed.

FIG. 2 is a view of the configuration schematically showing the air passage 6 for air-conditioning the vehicle 100 mounting the vehicle-mounted temperature controller 1. In the air passage 6, air flows in the direction shown by the arrow marks in the figure. The air passage 6 shown in FIG. 2 is connected to the outside of the vehicle 100 or the air intake openings of the passenger compartment. The outside air or the air inside the passenger compartment flows into the air passage 6, according to the state of control by the control device 5. Further, the air passage 6 shown in FIG. 2 is connected to air vent openings blowing air into the passenger compartment. Air is supplied from the air passage 6 to any of the air vent openings according to the state of control by the control device 5.

As shown in FIG. 2, at the air passage 6 for air-conditioning of the present embodiment, a blower 61, evaporator 26, air mix door 62, and heater core 44 are provided in that order in the direction of flow of the air.

The blower 61 is provided with a blower motor 61a and a blower fan 61b. The blower 61 is configured so that if the blower fan 61b is driven by the blower motor 61a, the outside air or the air inside the passenger compartment flows into the air passage 6 and the air flows through the air passage 6.

The air mix door 62 adjusts the flow rate of the air flowing through the heater core 44 in the air flowing through the air passage 6. The air mix door 62 is configured to be able to be adjusted among the state where all of the air flowing through the air passage 6 flows through the heater core 44, the state where none of the air flowing through the air passage 6 flows through the heater core 44, and states between them.

In the thus configured air passage 6, when the blower 61 is driven, if the refrigerant flows through the evaporator 26, the air flowing through the air passage 6 is cooled. Therefore, the passenger compartment is cooled. Further, when the blower 61 is driven, if the cooling water flows through the heater core 44 and the air mix door 62 is controlled so that air flows through the heater core 44, the air flowing through the air passage 6 is warmed. Therefore, the passenger compartment is warmed.

FIG. 3 is a view schematically showing the vehicle 100 mounting the vehicle-mounted temperature controller 1. As shown in FIG. 3, at the inside of the front grille of the vehicle 100, a low temperature radiator 33 and high temperature radiator 42 are arranged. Therefore, when the vehicle 100 is running, wind generated based on movement of vehicle strikes these radiators 33 and 42. Further, a fan 71 is provided adjacent to these radiators 33 and 42. The fan 71 is configured so that if driven, the air strikes the radiators 33 and 42. Therefore, even when the vehicle 100 is not running, by driving the fan 71, it is possible to make air strike the radiators 33.

Referring to FIG. 1, the control device 5 is provided with an electronic control unit (ECU) 51. The ECU 51 is provided with a processor for performing various types of processing, a memory storing programs and various types of information, and an interface connected with various actuators and various sensors.

Further, the control device 5 is provided with a battery temperature sensor 52 detecting the temperature of the battery element, a battery water temperature sensor 53 detecting the temperature of cooling water flowing into the battery heat exchanger 35. Further, the control device 5 is provided with a PCU temperature sensor 54 detecting the temperature of PCU element (i.e., temperature of element such as the inverter), and a PCU water temperature sensor 55 detecting the temperature of cooling water flowing into the PCU heat exchanger 36. In addition, the control device 5 is provided with an internal temperature sensor 56 detecting the temperature of the inside of the vehicle 100, an external temperature sensor 57 detecting the temperature of the outside of the vehicle 100, and a control panel 58 which is controlled by a user. The ECU 51 is connected to these sensors and control panel 58, and output signals from these sensors and the control panel 58 are input to the ECU 51.

In addition, the ECU 51 is connected to various types of actuators of the vehicle-mounted temperature controller 1 and controls these actuators. Specifically, the ECU 51 is connected to the compressor 21, the solenoid regulating valves 28 and 29, the pumps 31, 32 and 41, the three-way valves 43, the blower motor 61a, the air mix door 62, and the fan 71 and controls the same.

Note that, the configuration of the vehicle-mounted temperature controller 1 shown in FIGS. 1 to 3 is one example. The vehicle-mounted temperature controller may be configured differently as well. Specifically, for example, the chiller 27 may also be configured so as to discharge heat into the atmosphere from the refrigerant without connection with the low temperature circuit 3. Further, the low temperature circuit (cooling system) 3 may not be provided with the chiller, and may be configured independently from the refrigeration circuit or high temperature circuit.

Operation of Vehicle-Mounted Temperature Controller

Figure 4:
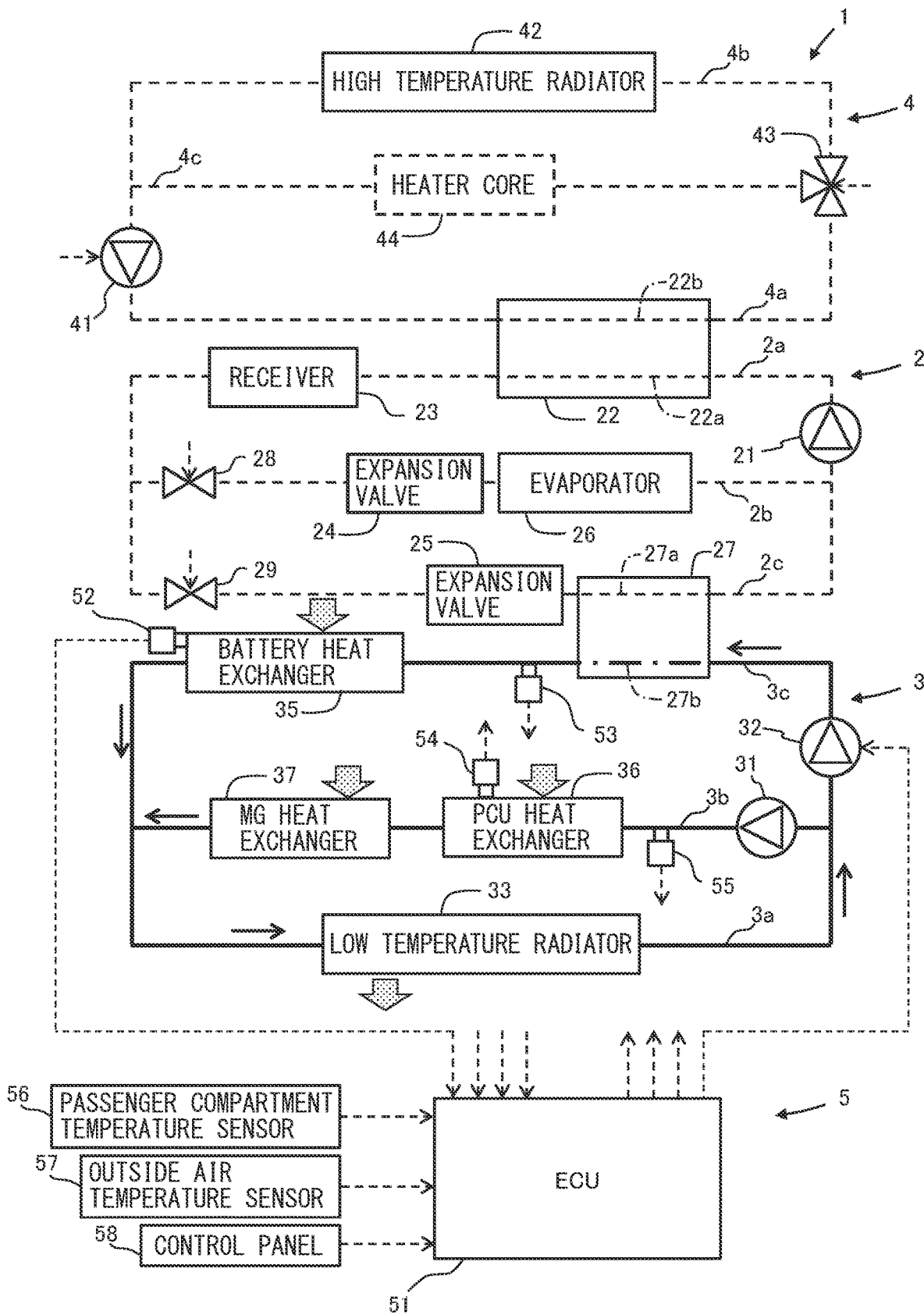
FIG. 4 shows an example of a state of operation of a vehicle-mounted temperature controller in the case where neither cooling nor heating of a passenger compartment is demanded (stopping mode).
Figure 5:
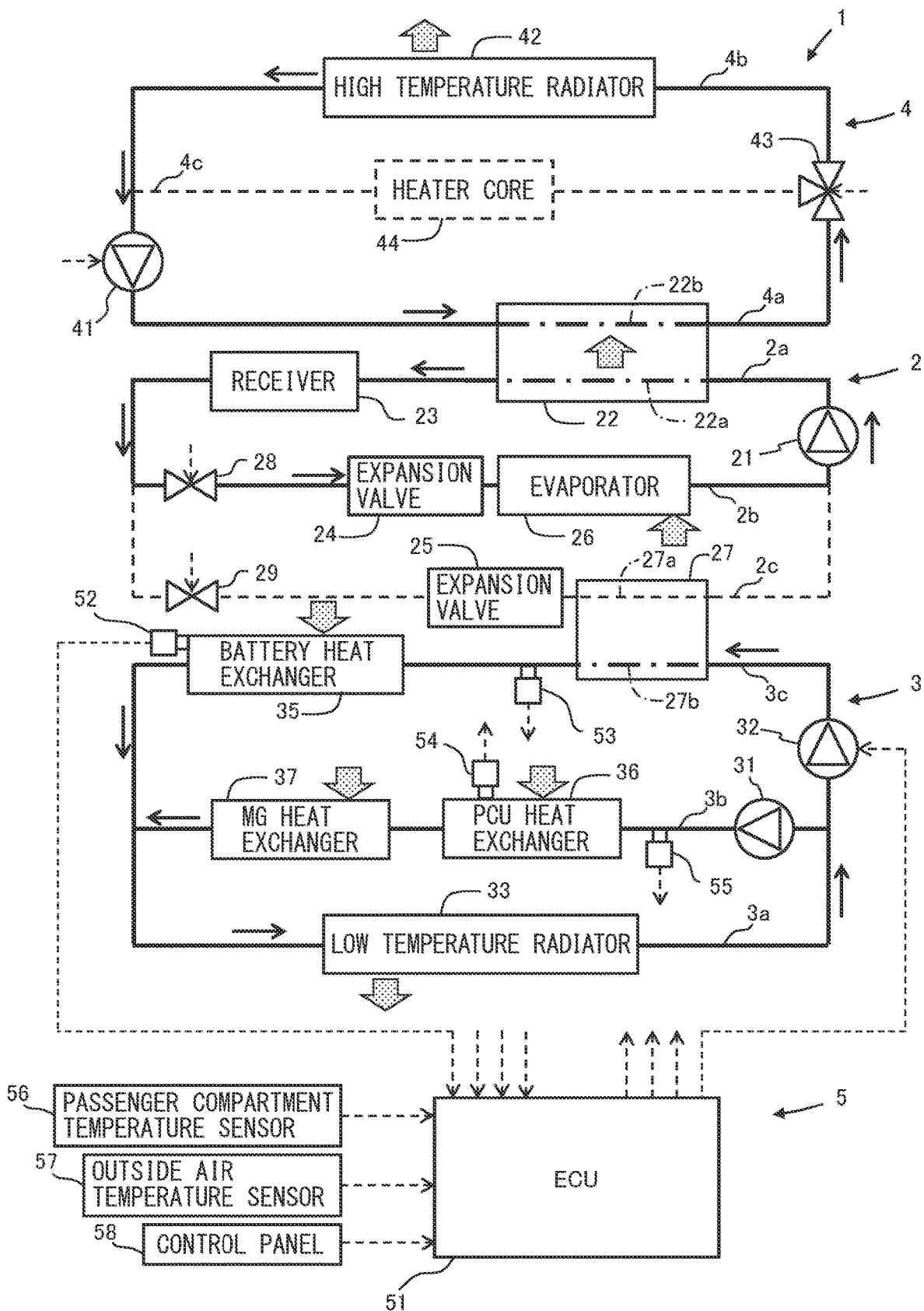
FIG. 5 shows an example of a state of operation of a vehicle-mounted temperature controller in the case where cooling of the passenger compartment is demanded (cooling mode).
Figure 6:
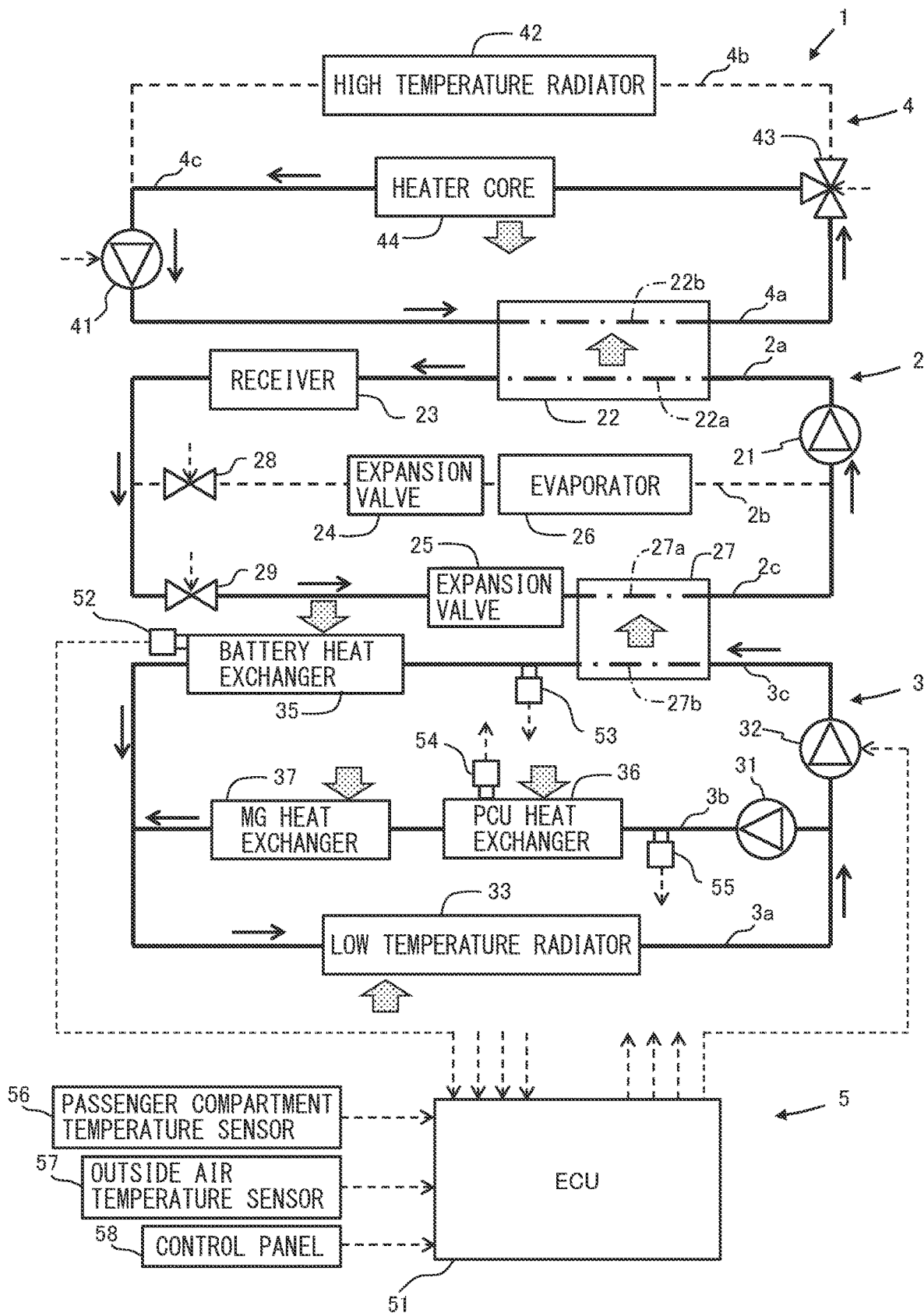
FIG. 6 shows an example of a state of operation of a vehicle-mounted temperature controller in the case where heating of the passenger compartment is demanded (heating mode).

The control device 5 sets the operating mode of the vehicle-mounted temperature controller 1, based on the output signals of the battery temperature sensor 52, PCU temperature sensor 54, internal temperature sensor 56, external temperature sensor 57, and control panel 58. Below, referring to FIGS. 4 to 6, typical operating modes of the vehicle-mounted temperature controller 1 will be explained. In FIGS. 4 to 6, the flow paths through which the refrigerant or the cooling water flows are shown by the solid lines, while the flow paths through which the refrigerant or the cooling water does not flow are shown by the broken lines. Further, the fine arrows in the figure show the flow directions of the refrigerant or the cooling water, while the thick arrows show the transfer directions of heat.

FIG. 4 shows an example of the operating state of the vehicle-mounted temperature controller 1, in the case where neither cooling nor heating of the passenger compartment is demanded (stopping mode). In the stopping mode, the PCU or battery is cooled without either of cooling or heating of the passenger compartment being performed.

As shown in FIG. 4, in the stopping mode, the first pump 31 and second pump 32 are operated and the compressor 21, and the third pump 41 are stopped. As a result, in the stopping mode, in the battery heat exchanger 35, PCU heat exchanger 36, or MG heat exchanger 37, heat of the battery, MG, or PCU is transferred to the cooling water. After that, the cooling water is cooled by exchanging heat with the outside air at the low temperature radiator 33 and again flows into these heat exchangers. Therefore, in the stopping mode, heat is absorbed from the heat generating equipment at the heat exchanger for heat generating equipment and that heat is discharged at the low temperature radiator 33.

FIG. 5 shows an example of the operating state of the vehicle-mounted temperature controller 1 in the case where cooling of the passenger compartment is demanded (cooling mode). In the cooling mode, the air to be cooled around the evaporator is cooled by the evaporator.

As shown in FIG. 5, in the cooling mode, all of the compressor 21, first pump 31, second pump 32, and third pump 41 are operated. Further, in the cooling mode, the first electromagnetic adjusting valve 28 is opened, the second electromagnetic adjusting valve 29 is closed, and the three-way valve 43 is set to a high temperature radiator flow path 4b side.

As a result, in the cooling mode, at the evaporator 26, the heat of the surrounding air is transferred to the refrigerant and the surrounding air is cooled. As a result, the inside of the passenger compartment is cooled. On the other hand, at the condenser 22, the heat of the refrigerant is transferred to the cooling water of the high temperature circuit 4, and the cooling water of the high temperature circuit 4 is warmed. After that, this high temperature cooling water is cooled by heat exchange with the outside air at the high temperature radiator 42 and again flows into the condenser 22. Therefore, in the cooling mode, heat is absorbed from the surrounding air by the evaporator 26 and that heat is discharged at the high temperature radiator 42.

Further, in the cooling mode, similarly to the stopping mode, the heat of the battery, MG, or PCU is transferred to the cooling water at the battery heat exchanger 35, PCU heat exchanger 36, or MG heat exchanger 37. Therefore, in the cooling mode, heat is absorbed from the heat generating equipment at the heat exchanger for heat generating equipment, and that heat is discharged at the low temperature radiator 33.

FIG. 6 shows an example of the operating state of the vehicle-mounted temperature controller 1 in the case where heating of the passenger compartment is demanded (heating mode). In the heating mode, the air to be heated around the heater core 44 is heated by the heater core 44.

As shown in FIG. 6, in the heating mode, all of the compressor 21, first pump 31, second pump 32 and third pump 41 are operated. Further, in the heating mode, the first electromagnetic adjusting valve 28 is closed, the second electromagnetic adjusting valve 29 is opened, and the three-way valve 43 is set to the heater flow path 4c side.

As a result, in the heating mode, the heat of the cooling water of the low temperature circuit 3 is transferred to the refrigerant at the chiller 27, whereby the cooling water is cooled. The low temperature cooling water flows through the low temperature radiator 33, whereby heat is absorbed from the outside air. Further, the low temperature cooling water flows through the battery heat exchanger 35, PCU heat exchanger 36, and MG heat exchanger 37, whereby heat is absorbed from the battery, MG, and PCU. Cooling water absorbing heat from the outside air or heat generating equipment discharges the heat to the refrigerant at the chiller 27.

Further, in the heating mode, the heat of the refrigerant is transferred to the cooling water of the high temperature circuit 4 at the condenser 22 of the refrigeration circuit 2, whereby the cooling water of the high temperature circuit 4 is warmed. After that, this high temperature cooling water exchanges heat with the outside air at the heater core 44, whereby the air around the heater core 44 is warmed. Therefore, in the heating mode, heat is absorbed from the outside air at the low temperature radiator 33 and heat is absorbed from the heat generating equipment at the heat exchanger for heat generating equipment, and that heat is discharged at the heater core 44.

Control of Pumps in Low Temperature Circuit

Figure 7A:
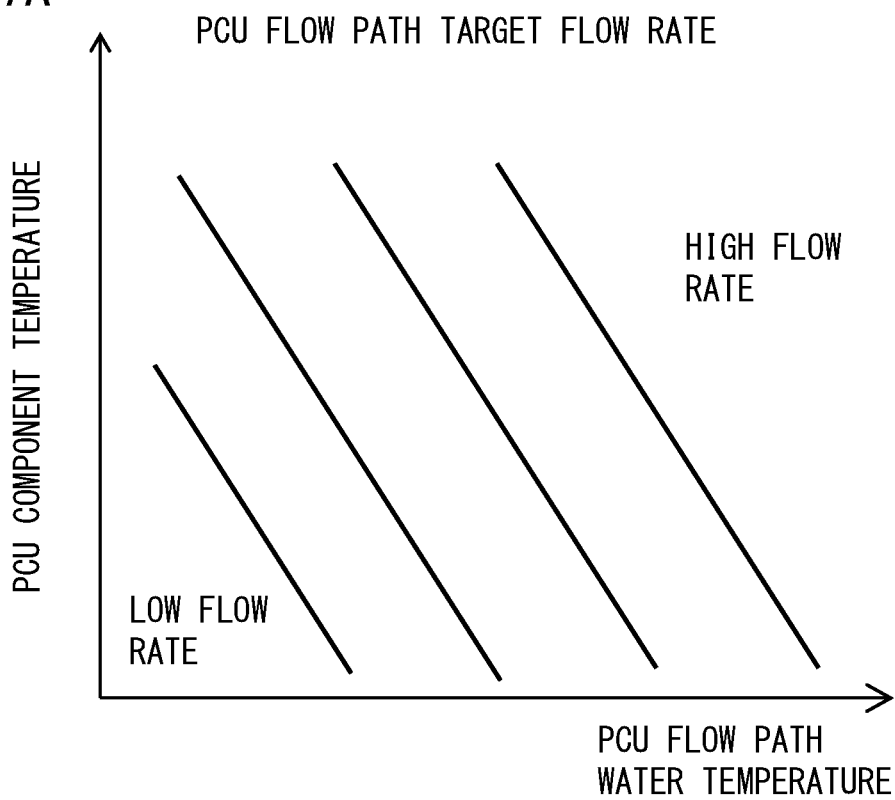
FIGS. 7A and 7B are views showing a method of setting target flow rates of the cooling water in a PCU flow path and battery flow path.
Figure 7B:
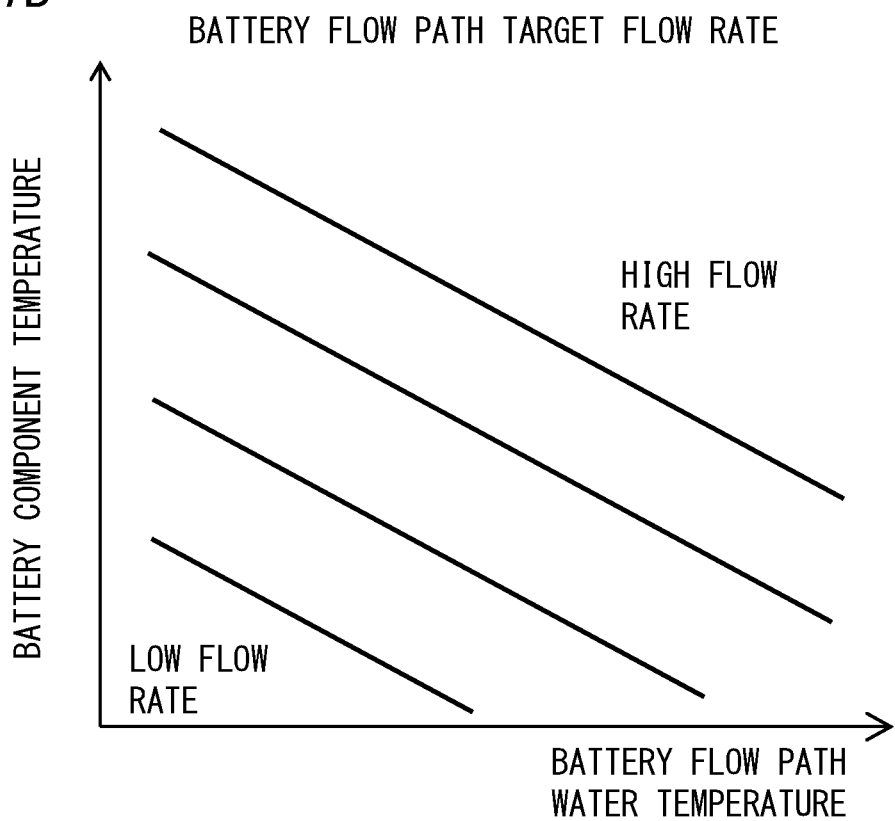
Figure 8A:
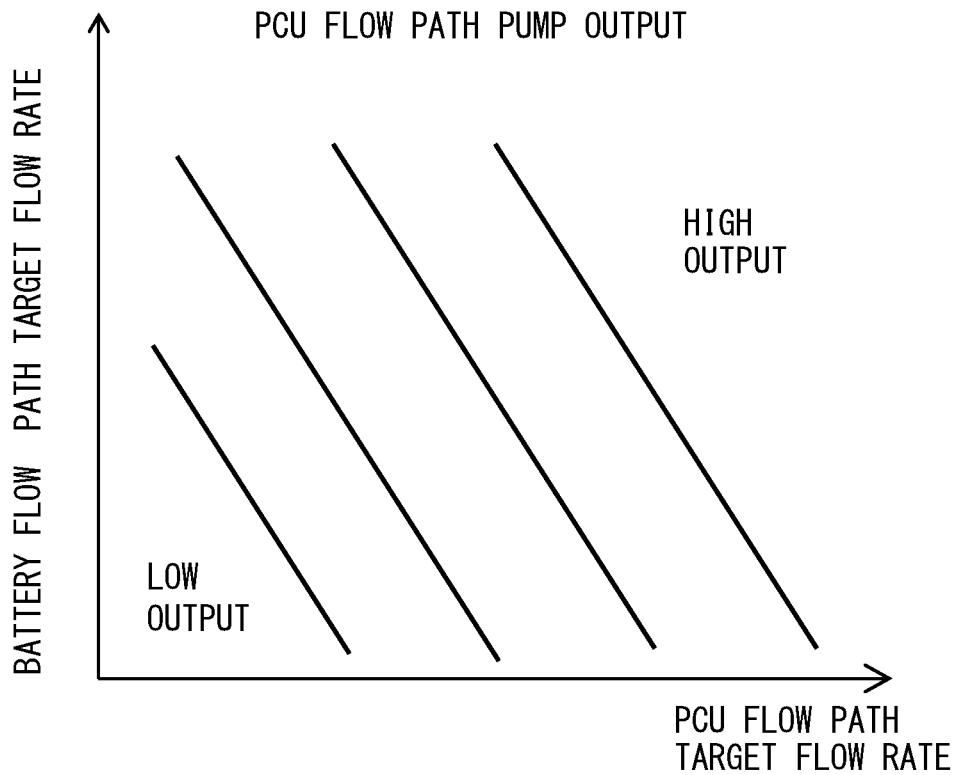
FIGS. 8A and 8B are views showing a method of setting target outputs of a first pump and a second pump.
Figure 8B:
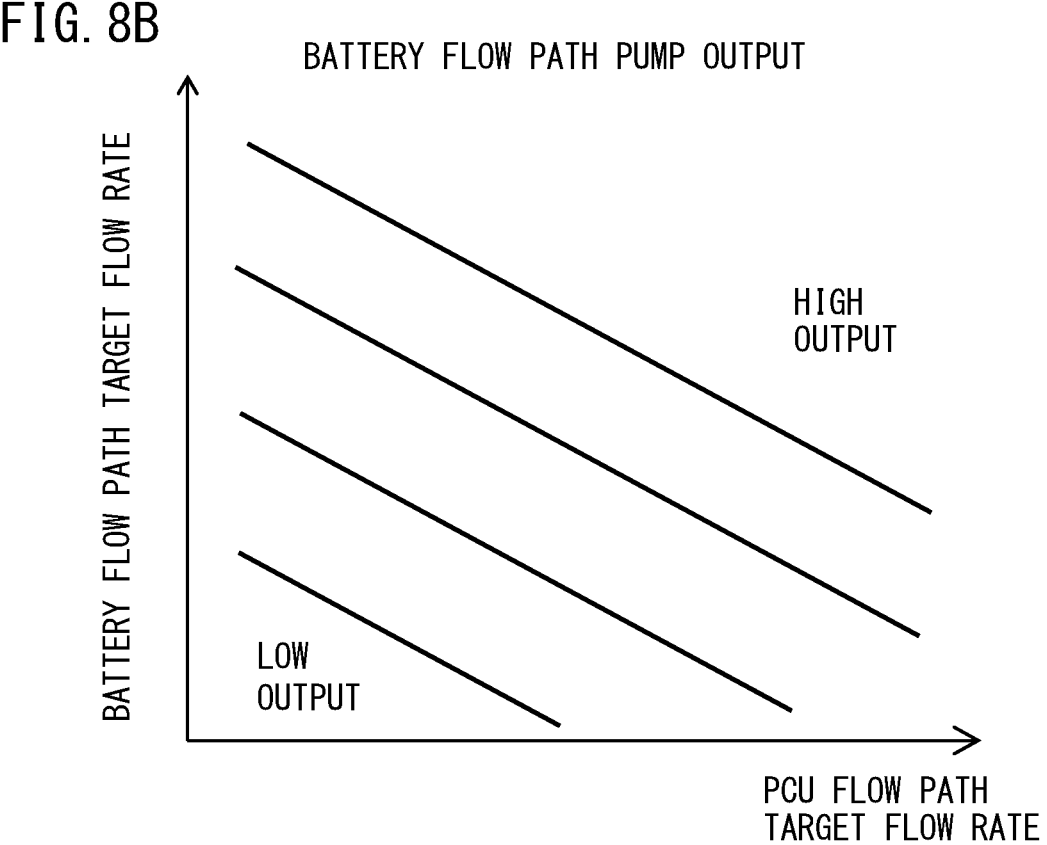

Next, referring to FIGS. 7A to 8B, control of the first pump 31 and second pump 32 at the low temperature circuit 3 will be explained. FIGS. 7A and 7B are views showing the method of setting the target flow rates of the cooling water of the PCU flow path 3*b* and the battery flow path 3*c*. Further, FIGS. 8A and 8B are views showing the method of setting the target outputs of the first pump 31 and second pump 32.

In the present embodiment, the target flow rate at the PCU flow path 3*b* of the cooling water is set based on the temperature of the cooling water flowing through the PCU flow path 3*b* and the temperature of elements of the PCU. Specifically, the target flow rate, as shown in FIG. 7A, is set so as to become greater as the temperature of the cooling water flowing through the PCU flow path 3*b* becomes higher, and so as to become greater as the temperature of the element of the PCU becomes higher. In particular, in the present embodiment, the target flow rate is set so that the temperature of the cooling water flowing through the PCU flow path 3*b* becomes relatively large in the effect on the target flow rate, compared with the temperature of the element of the PCU. This is because the fluctuation of the temperature of the element of the PCU (or the parts forming the PCU) due to the load of the motor, etc., is large, therefore even if changing the target flow rate in accordance with the temperature of the element of the PCU, it is difficult to suitably control the temperature of the element of the PCU.

Further, in the present embodiment, the target flow rate at the battery flow path 3*c* of the cooling water is set based on the temperature of the cooling water flowing through the battery flow path 3*c* and the temperature of the element of the battery. Specifically, the target flow rate, as shown in FIG. 7B, is set so as to become greater as the temperature of the cooling water flowing through the battery flow path 3*c* becomes higher, and so as to become greater as the temperature of the element of the battery becomes higher. In particular, in the present embodiment, the target flow rate is set so that the temperature of the element of the battery becomes relatively greater in effect on the target flow rate, compared with the temperature of the cooling water flowing through the battery flow path 3*c*. This is because the battery is large in heat capacity and small in fluctuation according to the load of the motor, etc., therefore if changing the target flow rate in accordance with the temperature of the element of the battery, the temperature of the element of the battery is easy to suitably control.

Note that, in the present embodiment, the target flow rate at the PCU flow path 3*b* of the cooling water is set based on the temperature of the cooling water flowing through the PCU flow path 3*b* and the temperature of the element of the PCU. However, it is not necessarily required to set the target flow rate based on these two temperatures. The target flow rate may also be set based on only one among these (for example, only the temperature of the cooling water flowing through the PCU flow path 3*b*) or based on other parameters. Similarly, in the present embodiment, the target flow rate at the battery flow path 3*c* of the cooling water is set based the temperature of the cooling water flowing through the battery flow path 3*c* and the temperature of the element of the battery. However, it is not necessarily required to set the target flow rate based on these two temperatures. The target flow rate may also be set based on only one among these (for example, only the temperature of the element of the battery) or based on other parameters.

The outputs of the first pump 31 provided at the PCU flow path 3*b* and the second pump 32 provided at the battery flow path 3*c* are set based on the target flow rates of the PCU flow path 3*b* and battery flow path 3*c*, set as above. Note that, the outputs of these pumps are adjusted by changing the duty ratios of the electric power supplied to the pumps or changing the values of the current or values of the voltage supplied to the pumps. Further, the rotational speeds of the pumps are changed by changing the outputs of these pumps.

Here, in the present embodiment, the PCU flow path 3*b* and battery flow path 3*c* are connected in parallel to the low temperature radiator flow path 3*a*. Therefore, if changing the output of the first pump 31, not only the flow rate of the cooling water flowing through the PCU flow path 3*b*, but also the flow rate of the cooling water flowing through the battery flow path 3*c* changes. Similarly, if changing the output of the second pump 32, not only the flow rate of the cooling water flowing through the battery flow path 3*c*, but also the flow rate of the cooling water flowing through the PCU flow path 3*b* changes.

Therefore, in the present embodiment, the outputs of the pumps 31, 32 are set based on the target flow rate of the cooling water flowing through the PCU flow path 3*b* and the target flow rate of the cooling water flowing through the battery flow path 3*c*.

Specifically, as shown in FIG. 8A, the target output of the first pump 31 provided at PCU flow path 3*b* is set so as to become higher as the target flow rate of the cooling water flowing through the PCU flow path 3*b* becomes greater, and so as to become higher as the target flow rate of the cooling water flowing through the battery flow path 3*c* becomes greater. Further, as shown in FIG. 8B, the target output of the second pump 32 provided at the battery flow path 3*c* is also set so as to become higher as the target flow rate of the cooling water flowing through the PCU flow path 3*b* becomes greater, and so as to become higher as the target flow rate of the cooling water flowing through the battery flow path 3*c* becomes greater.

Control of Pumps when Changing Flow Rates

In the low temperature circuit 3 configured as above, if increasing both the target flow rate at the PCU flow path 3*b* and the target flow rate at the battery flow path 3*c*, the outputs of both the first pump 31 and second pump 32 are raised. Further, even if increasing one of the target flow rate at the PCU flow path 3*b* and the target flow rate at the battery flow path 3*c* and maintaining the other, both the outputs of the first pump 31 and the second pump 32 are made to rise.

Figure 9:
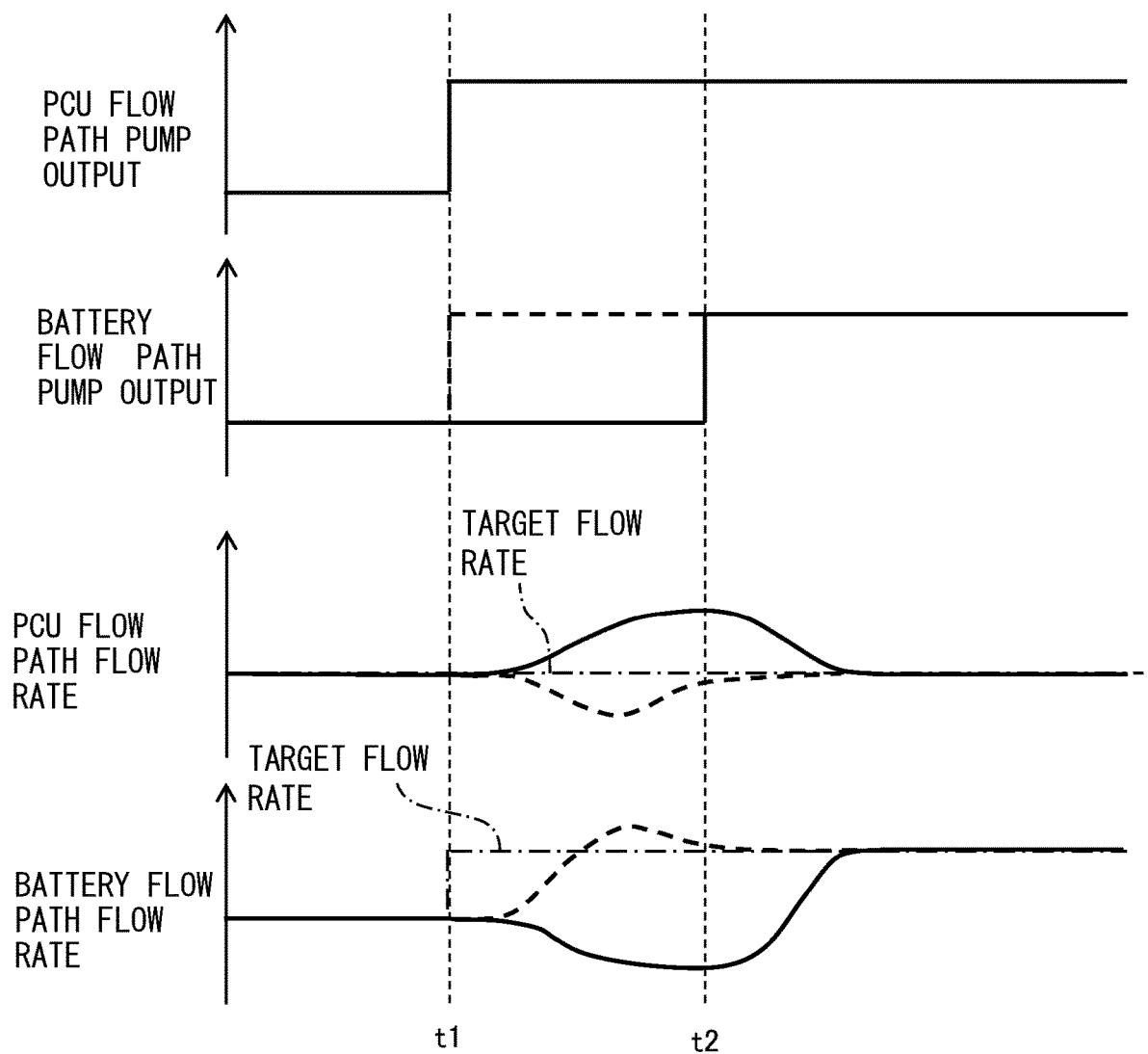
FIG. 9 is a time chart of the output of the first pump, etc., in the case of raising both of the outputs of the first pump and second pump.

FIG. 9 is a time chart of the output of the first pump (pump of PCU flow path 3*b*) 31, the output of the second pump (pump of battery flow path 3*c*), the flow rate of the cooling water at the PCU flow path 3*b*, and the flow rate of the cooling water at the battery flow path 3*c*, in the case of raising both the outputs of the first pump 31 and the second pump 32. The example shown in FIG. 9 shows the case where, at the time t1, the target flow rate at the battery flow path 3*c* is increased and the target flow rate at the PCU flow path 3*b* is maintained.

The broken lines of FIG. 9 show the case where at the time t1 the outputs of the first pump 31 and the second pump 32 are simultaneously made to rise, along with the increase of the target flow rate at the battery flow path 3*c*. In the example shown in FIG. 9, in this case, right after the time t1, the flow rate of the PCU flow path 3*b* temporarily decreases to less than the target flow rate, and the flow rate of the battery flow path 3*c* temporarily increases over the target flow rate. In this way, in the case of simultaneously raising the outputs of the first pump 31 and the second pump 32, the flow rate of the PCU flow path 3*b* may temporarily become less than the target flow rate in accordance with the viscosity of the cooling water, the temperature of the cooling water at each flow path, the magnitude of the pump drive voltage, etc.

Here, as explained above, the temperature of the element of the PCU (or parts forming the PCU) greatly fluctuates in accordance with the load of the motor, etc. For this reason, it is necessary to always supply a certain amount of cooling water to the PCU heat exchanger 36 so as to enable the PCU to be sufficiently cooled even if the temperature of the element rapidly rises. In this regard, however, as explained above, if the flow rate of the PCU flow path 3b becomes temporarily less than the target flow rate, it becomes no longer possible to sufficiently cool the element when the temperature of the element rapidly rises, and the temperature of the element of the PCU may excessively rise.

Therefore, in the present embodiment, as shown in FIG. 9 by the solid lines, when the target flow rate at the battery flow path 3c increases, the output of the first pump is made to rise before the output of the second pump 32. Specifically, in the example shown in FIG. 9, at the time t1, the output of the first pump 31 is raised. At the time t2 after a predetermined time elapses from the time t1, the output of the second pump 32 is raised. As a result, as shown in FIG. 9 by the solid lines, the flow rate of the PCU flow path 3b becomes temporarily greater than the target flow rate. For this reason, the flow rate of the PCU flow path 3b is kept from temporarily becoming less than the target flow rate, and accordingly an excessive rise in temperature of the element of the PCU is suppressed.

Here, the predetermined time from the time t1 to the time t2 is set to a time where the flow rate of the PCU flow path 3b will always become temporarily greater than the target flow rate, regardless of the viscosity of the cooling water, the temperature of the cooling water at each of the flow paths, or the magnitude of the pump drive voltage, etc.

Note that, FIG. 9 shows the case where the target flow rate at the battery flow path 3c is increased, but even in other cases where the outputs of the first pump 31 and the second pump 32 are both made to rise, in the same way as the example shown in FIG. 9, the output of the first pump 31 rises before the output of the second pump 32 rises. In other words, when making both the outputs of the first pump 31 and the second pump 32 rise, the outputs of the first pump 31 and the second pump 32 are controlled so that the flow rate of the PCU flow path 3b becomes temporarily greater than the target flow rate.

Figure 10:
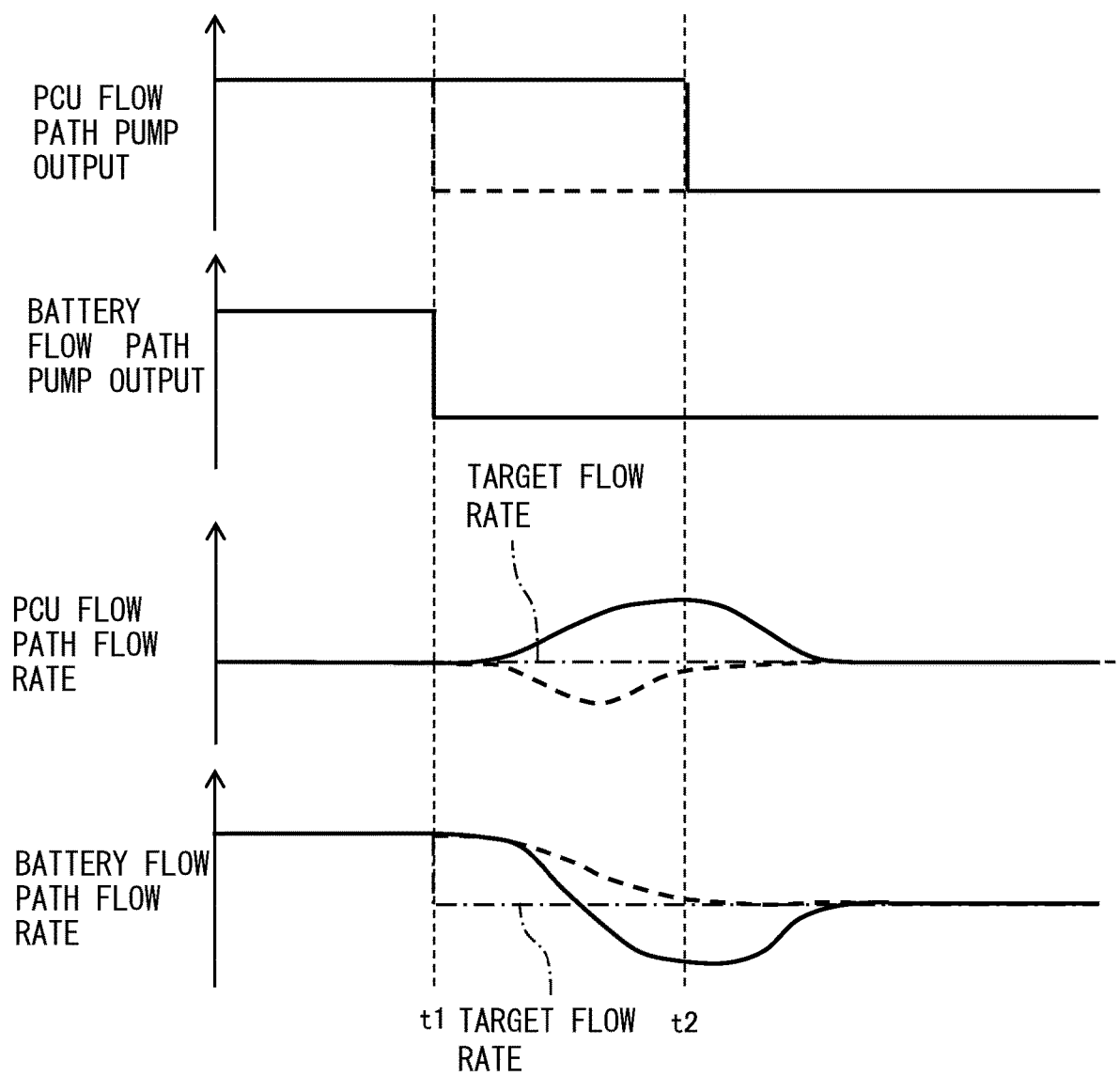
FIG. 10 is a time chart of the output of the first pump, etc., in the case of lowering both of the outputs of the first pump and second pump.

FIG. 10 is a time chart of the output of the first pump 31, etc., in the case of lowering both the outputs of the first pump 31 and the second pump 32. The example shown in FIG. 10 shows the case where, at the time t1, the target flow rate at the battery flow path 3c is reduced and the target flow rate at the PCU flow path 3b is maintained.

The broken lines of FIG. 10 show the case where, at the time t1, the outputs of the first pump 31 and the second pump 32 are simultaneously reduced along with a reduction in the target flow rate at the battery flow path 3c. As will be understood from FIG. 10, in this case, the flow rate of the PCU flow path 3b may temporarily become less than the target flow rate.

Therefore, in the present embodiment, as shown in FIG. 10 by the solid lines, when the target flow rate at the battery flow path 3c is reduced, the output of the second pump 32 is reduced before the output of the first pump 31 is reduced. Specifically, in the example shown in FIG. 10, the output of the second pump 32 is reduced, while at the time t2 after a predetermined time elapses from the time t1, the output of the first pump 31 is reduced. As a result, as shown in FIG. 10 by the solid lines, the flow rate of the PCU flow path 3b becomes temporarily greater than the target flow rate. Accordingly, an excessive rise in temperature of the element of the PCU is suppressed. The predetermined time from the time t1 to the time t2 is set to a time where the flow rate of the PCU flow path 3b becomes temporarily greater than the target flow rate regardless of the viscosity of the cooling water, etc.

Note that, FIG. 10 shows the case of reducing the target flow rate at the battery flow path 3c, but even in other cases reducing both the outputs of the first pump 31 and the second pump 32, in the same way as the example shown in FIG. 10, the output of the second pump 32 is lowered before the output of the first pump 31. In other words, when lowering both the outputs of the first pump 31 and the second pump 32, the outputs of the first pump 31 and the second pump 32 are controlled so that flow rate of the PCU flow path 3b becomes temporarily greater than the target flow rate.

Specific Control

Figure 11:
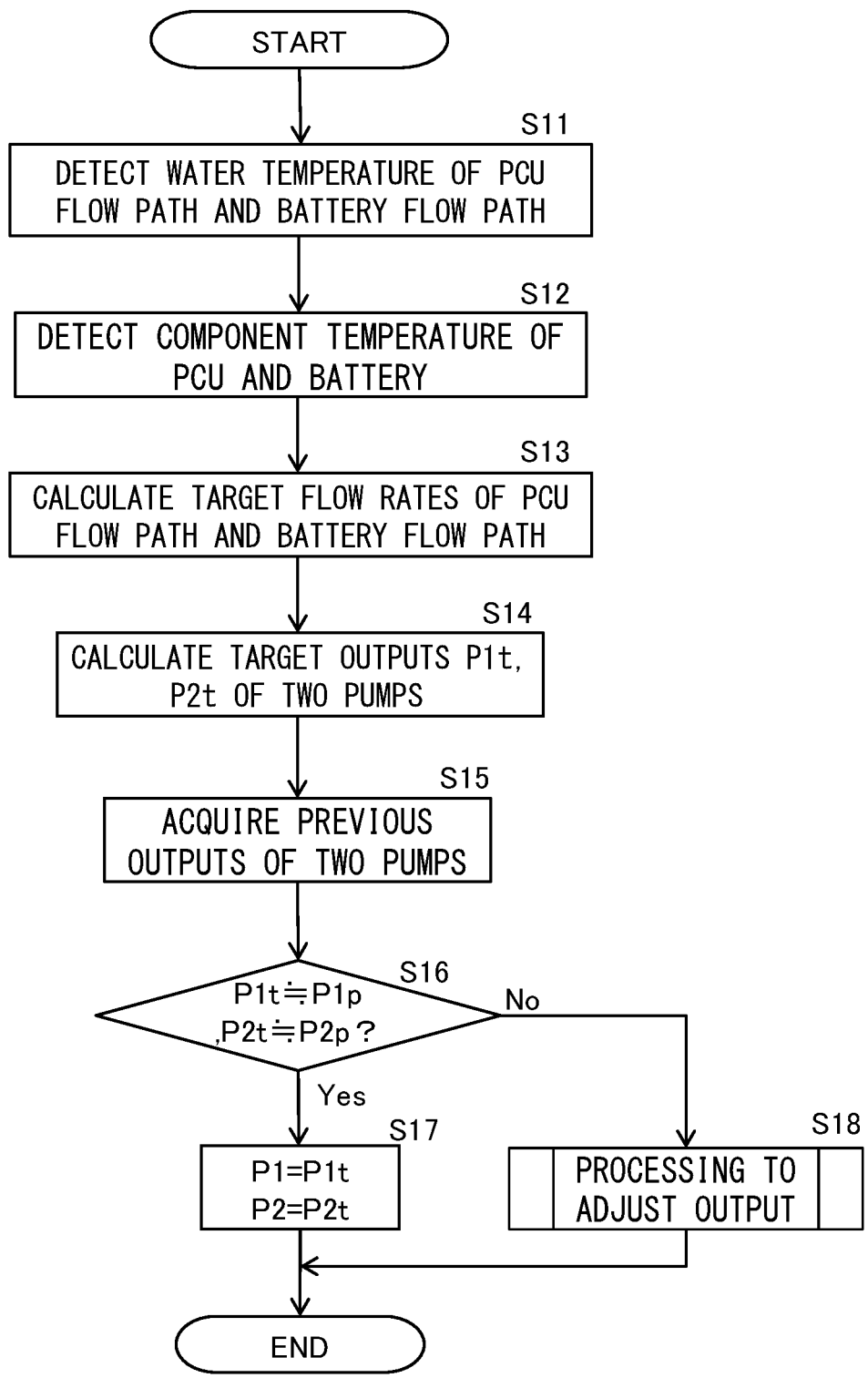
FIG. 11 is a flow chart showing a control routine for controlling the outputs of the first pump and second pump.

FIG. 11 is a flow chart showing a control routine for controlling the outputs of the first pump 31 and the second pump 32. The illustrated control routine is executed every certain time interval by the ECU 51.

First, at step S11, the temperature of the cooling water flowing through the PCU flow path 3b and the temperature of the cooling water flowing through the battery flow path 3c are respectively detected by the PCU water temperature sensor 55 and battery water temperature sensor 53. Next, at step S12, the temperature of the element of the PCU and the temperature of the element of the battery are respectively detected by the PCU temperature sensor 54 and battery temperature sensor 52.

After that, at step S13, using the map as shown in FIG. 7A, the target flow rate at the PCU flow path 3b is calculated based on the temperature of the cooling water flowing through the PCU flow path 3b detected at step S11 and the temperature of the element of the PCU detected at step S12. In addition, using the map shown in FIG. 7B, the target flow rate at the battery flow path 3c is calculated based on the temperature of the cooling water flowing through the battery flow path 3c detected at step S11 and the temperature of the element of the battery detected at step S12.

Next, at step S14, using maps as shown in FIGS. 8A and 8B, the target output P1t of the first pump 31 and the target output P2t of the second pump 32 are calculated based on the target flow rate at the PCU flow path 3b calculated at step S13 and the target flow rate at the battery flow path 3c. After that, at step S15, the previous output P1p of the first pump 31 and the previous output P2p of the second pump 32 are acquired.

Next, at step S16, it is judged if the target output P1t of the first pump 31 and the target output P2t of the second pump 32 are substantially equal to the previous output P1p of the first pump 31 and the previous output P2p of the second pump 32, respectively. When it is judged that the two target outputs are respectively substantially equal to the two previous outputs, the control routine proceeds to step S17. At step S17, the output P1 of the first pump 31 is set to the target output P1t, the output P2 of the second pump 32 is set to the target output P2t, and the control routine is ended. On the other hand, if at step S16 it is judged that at least one of the target outputs differs from the previous output thereof, the control routine proceeds to step S18. At step S18, the later explained processing for adjusting the output is performed.

Figure 12:
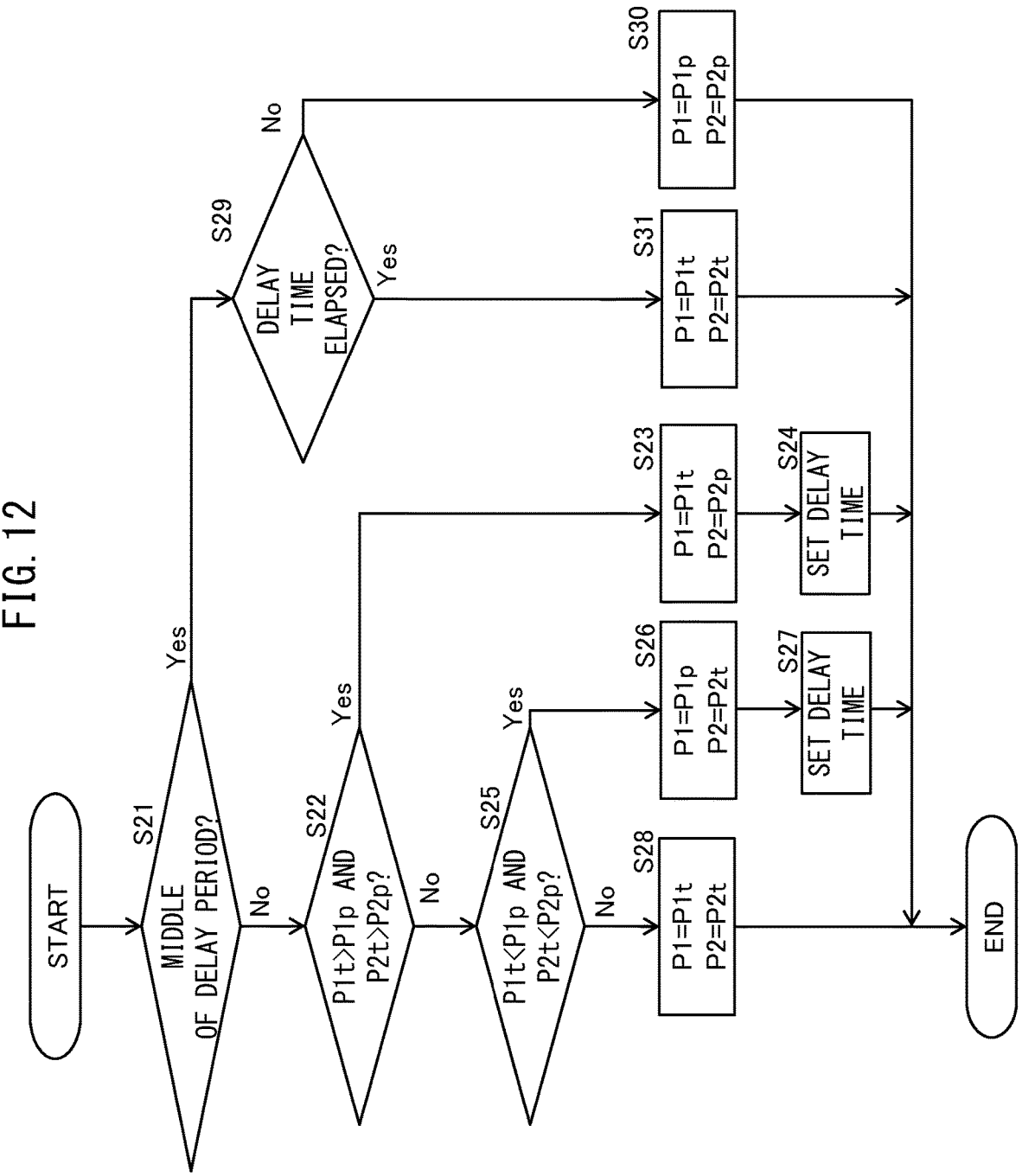
FIG. 12 is a flow chart showing a control routine for processing for adjusting the output performed at step S18 of FIG. 11.

FIG. 12 is a flow chart showing a control routine of processing for adjusting the output performed at step S18 of FIG. 11. As shown in FIG. 12, first, at step S21, it is judged if the delay period is in progress. The delay period is the period waiting for the change of output of one pump, and corresponds to the period between the times t1 and t2 in FIGS. 9 and 10.

If at step S21 it is judged that the time is not in the middle of the delay period, the control routine proceeds to step S22. At step S22, it is judged if both of the target flow rates of the two pumps 31, 32 are greater than the previous flow rates. If it is judged that the target flow rates of the two pumps 31, 32 are both greater than the previous flow rates, the control routine proceeds to step S23. At step S23, the output P1 of the first pump 31 is set to the target output P1*t* calculated at step S14 and the output P2 of the second pump 32 is maintained as is at the previous output P2*p*. Next, at step S24, the delay time is set. The delay time may be a constant value set in advance or may be a value changing in accordance with a parameter such as the difference between the target flow rate at the PCU flow path 3*b* or the battery flow path 3*c* and the previous flow rate.

On the other hand, if at step S22 it is judged that at least one of the target flow rates of the two pumps 31, 32 is less than or equal to the previous flow rate, the control routine proceeds to step S25. At step S25, it is judged if both of the target outputs of the two pumps 31, 32 are smaller than the previous flow rates. If it is judged that both of the target outputs of the two pumps 31, 32 are smaller than the previous flow rates, the control routine proceeds to step S26. At step S26, the output P1 of the first pump 31 is maintained at the previous output P1*p* as is and the output P2 of the second pump 32 is set to the target output P2*t* calculated at step S14. Next, at step S24, the delay period is set.

If at steps S22, S25 it is judged that one of the target flow rates of the two pumps 31, 32 is smaller than the previous flow rate and the other is larger than the previous flow rate, the control routine proceeds to step S28. At step S28, the output P1 of the first pump 31 is set to the target output P1*t*, the output P2 of the second pump 32 is set to the target output P2*t*, and the control routine is ended.

On the other hand, if at step S21 it is judged that the current time is the delay period due to the delay time being set at step S24 or S27 of the past control routine, the control routine proceeds to step S29. At step S29, it is judged if the delay time set at step S24 or S27 has elapsed from when the delay period was started. If it is judged that the delay time has not elapsed, the control routine proceeds to step S30. At step S30, the output P1 of the first pump 31 and the output P2 of the second pump 32 are both respectively set to the previous outputs P1*p*, P2*p*. On the other hand, if at step S29 it is judged that the delay time has elapsed, the control routine proceeds to step S31. At step S31, the output P1 of the first pump 31 and the output P2 of the second pump 32 are both set to the target outputs P1*t*, P2*t*, and the control routine is ended.

Second Embodiment

Next, referring to FIGS. 13 to 15, a vehicle-mounted temperature controller according to a second embodiment will be explained. The configuration and control of the vehicle-mounted temperature controller according to the second embodiment are basically the same as the configuration and control of the vehicle-mounted temperature controller according to the first embodiment. Below, the parts different from the vehicle-mounted temperature controller according to the first embodiment will be focused on in the explanation.

Figure 13:
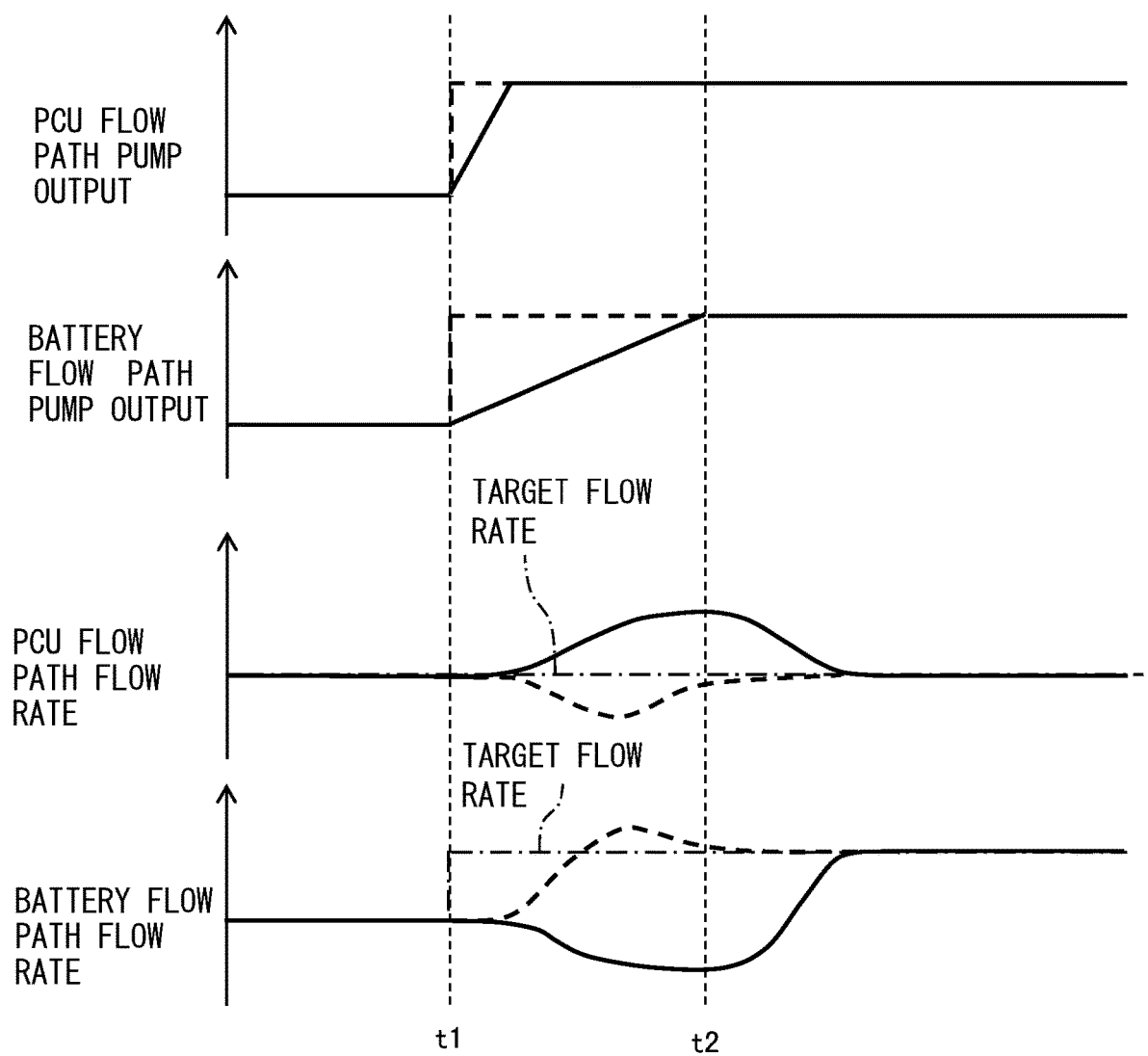
FIG. 13 is a time chart of the output of the first pump, etc., in the case of raising both of the outputs of the first pump and second pump.

FIG. 13 is a time chart of the output of the first pump 31, etc., in the case of raising both of the outputs of the first pump 31 and the second pump 32. The broken lines in FIG. 13 show trends the same as the broken lines of FIG. 9.

In the present embodiment, as shown in FIG. 13 by the solid lines, if the target flow rate at the battery flow path 3*c* increases at the time t1, the rises in the outputs of the first pump 31 and the second pump 32 are simultaneously started. In addition, in the present embodiment, the rate of rise of the output of the first pump 31 is controlled so as to become faster than the rate of rise of the output of the second pump 32. Specifically, for example, if the output of the pump is adjusted by changing the duty ratio, the first pump 31 and second pump 32 are controlled so that the amount of rise per unit time of the duty ratio becomes larger at the first pump 31 than the second pump 32. As a result, as shown in FIG. 13 by the solid lines, the flow rate of the PCU flow path 3*b* becomes temporarily greater than the target flow rate. For this reason, the flow rate of the PCU flow path 3*b* is kept from becoming temporarily less than the target flow rate. Accordingly, an excessive rise in temperature of the element of the PCU is suppressed.

Here, the rates of rise of the first pump 31 and second pump 32 are set so that, regardless of the viscosity of the cooling water, the temperature of the cooling water at the flow paths, or the magnitude of the pump drive voltage, etc., the flow rate of the PCU flow path 3*b* is set to always become temporarily greater than the target flow rate.

Note that, FIG. 13 shows the case where the target flow rate at the battery flow path 3*c* increases, but even in other cases where the outputs of the first pump 31 and the second pump 32 are both raised, in the same way as the example shown in FIG. 13, the rate of rise of the output of the first pump 31 is set to become faster than the rate of rise of the output of the second pump 32. Further, in the present embodiment, the rises in the outputs of the first pump 31 and the second pump 32 are simultaneously started, but the rise of the output of the first pump 31 may be started before the start of rise of the output of the second pump 32. Whatever the case, in the present embodiment as well, when the outputs of the first pump 31 and the second pump 32 are both raised, the outputs of the first pump 31 and the second pump 32 are controlled so that the flow rate of the PCU flow path 3*b* becomes temporarily larger than the target flow rates.

Figure 14:
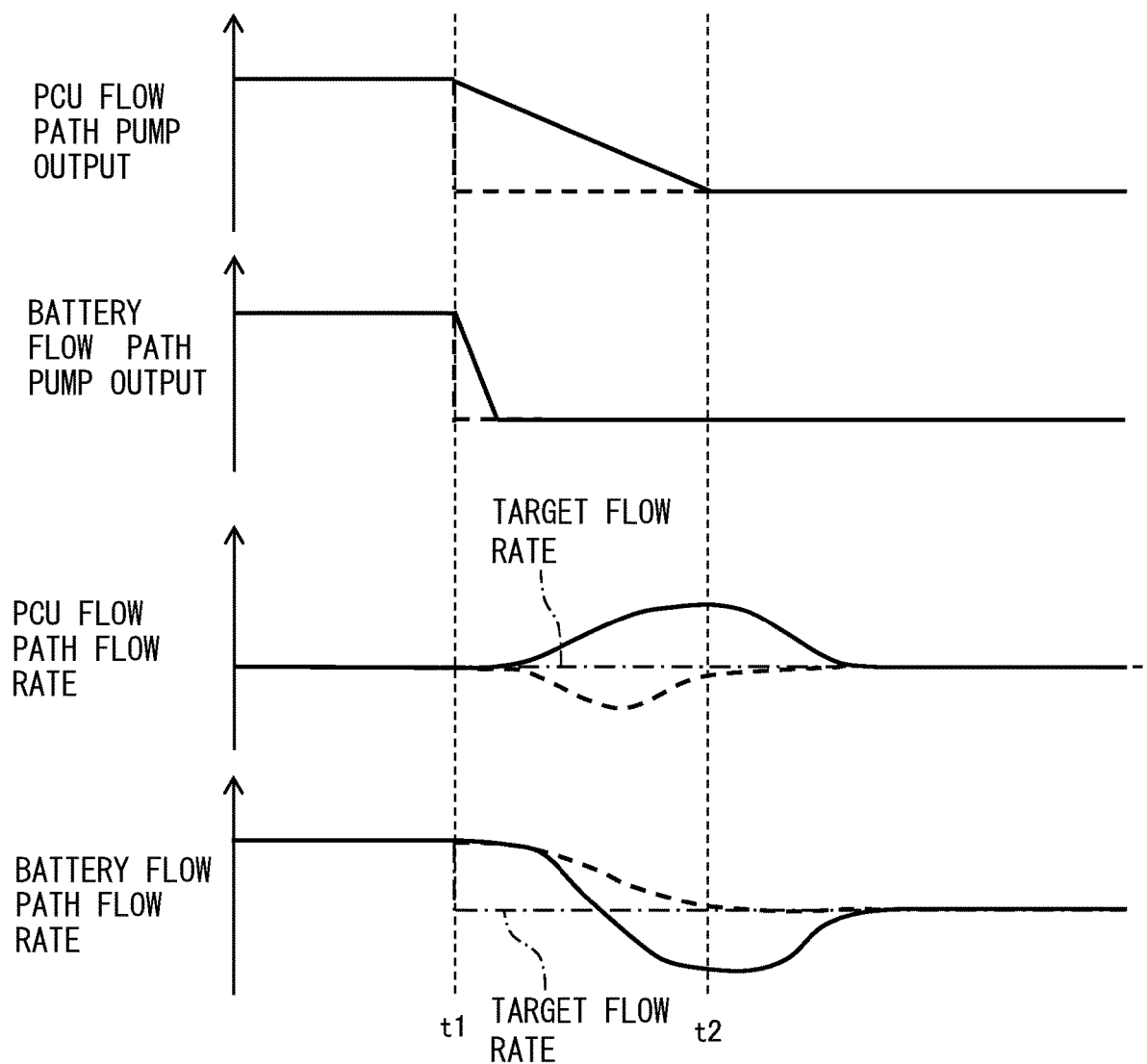
FIG. 14 is a time chart of the output of the first pump, etc., in the case of lowering both of the outputs of the first pump and second pump.

FIG. 14 is a time chart of the output of the first pump 31, etc., in the case of reducing both of the outputs of the first pump 31 and the second pump 32. The broken lines in FIG. 14 show trends the same as the broken lines of FIG. 10.

In the present embodiment, as shown in FIG. 14 by the solid lines, if at the time t1 the target flow rate at the battery flow path 3*c* is reduced, the reductions in the outputs of the first pump 31 and the second pump 32 are simultaneously started. In addition, in the present embodiment, the rate of fall of the output of the second pump 32 is controlled to become faster than the rate of fall of the output of the first pump 31. Specifically, for example, if the outputs of the pumps are adjusted by changing the duty ratio, the first pump 31 and second pump 32 are controlled so that the amount of reduction per unit time of the duty ratio becomes larger at the second pump 32 than the first pump 31. As a result, as shown in FIG. 14 by the solid lines, the flow rate of the PCU flow path 3*b* becomes temporarily greater than the target flow rate. For this reason, the flow rate of the PCU flow path 3*b* is kept from temporarily becoming less than the target flow rate and accordingly an excessive rise in temperature of the element of the PCU is suppressed.

Here, the rates of reduction of the first pump 31 and second pump 32 are set so that, regardless of the viscosity of the cooling water, the temperature of the cooling water at the flow paths, or the magnitude of the pump drive voltage, etc., the flow rate of the PCU flow path 3b is set to always become temporarily greater than the target flow rate.

Note that, FIG. 14 shows the case where the target flow rate at the battery flow path 3c falls, but even in other cases where the outputs of the first pump 31 and the second pump 32 are reduced, in the same way as the example shown in FIG. 14, the rate of fall of the output of the second pump 32 is set to become faster than the rate of fall of the output of the first pump 31. Further, in the present embodiment, the reductions in the outputs of the first pump 31 and the second pump 32 are simultaneously started, but the reduction of the output of the second pump 32 may be started before the start of reduction of the output of the first pump 31. Whatever the case, in the present embodiment as well, when the outputs of the first pump 31 and the second pump 32 are both lowered, the outputs of the first pump 31 and the second pump 32 are controlled so that the flow rate of the PCU flow path 3b becomes temporarily larger than the target flow rates.

Flow Chart

Figure 15:
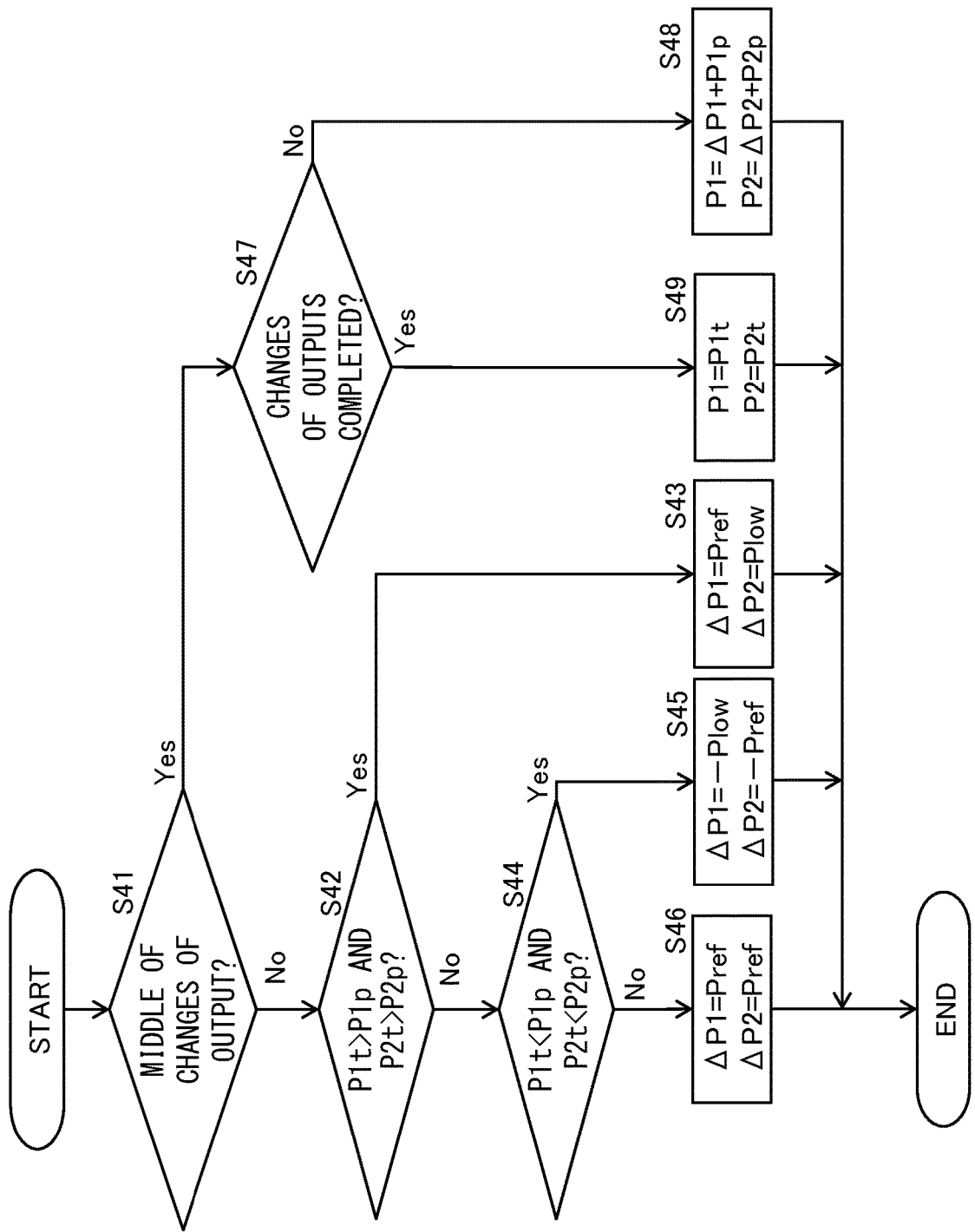
FIG. 15 is a flow chart showing a control routine for processing for adjusting the output performed at step S18 of FIG. 11.

FIG. 15 is a flow chart showing a control routine of processing for adjusting the output performed at step S18 of FIG. 11. As shown in FIG. 15, first, at step S41, it is judged if the outputs of the pumps 31, 32 are in the middle of being changed. The pumps 31, 32, for example, are judged to be in the middle of being changed in outputs in the period between the times t1 and t2 in FIGS. 13 and 14.

If it is judged at step S41 that they are not in the middle of being changed in outputs, the control routine proceeds to step S42. At step S42, it is judged if both of the target flow rates of the two pumps 31, 32 are greater than the previous flow rates. If it is judged that the target flow rates of both pumps 31, 32 are greater than the previous flow rates, the control routine proceeds to step S43. At step S43, the rate of change ΔP1 of the output of the first pump 31 is set to the reference rate Pref and the rate of change ΔP2 of the output of the second pump 32 is set to the low rate Plow slower than the reference rate.

On the other hand, if at step S42 it is judged that at least one of the target flow rates of the pumps 31, 32 is equal to or less than the previous flow rate, the control routine proceeds to step S44. At step S44, it is judged if the target outputs of the both pumps 31, 32 are smaller than the previous flow rates. If it is judged that the target outputs of both of the pumps 31, 32 are smaller than the previous flow rates, the control routine proceeds to step S45. At step S45, the rate of change ΔP1 of the output of the first pump 31 is set to the low rate—Plow and the rate of change ΔP2 of the output of the second pump 32 is set to the reference rate—Pref.

If at steps S42, S44 it is judged that one of the target flow rates of the two pumps 31, 32 is smaller than the previous flow rate and the other is larger than the previous flow rate, the control routine proceeds to step S46. At step S46, the rates of changes ΔP1, ΔP2 of the outputs of the two pumps 31, 32 are set to the reference rate Pref (or –Pref), and the control routine is ended.

On the other hand, if at step S41 it is judged that the rates of changes of the outputs of the pumps 31, 32 were set at step S43, S45, or S46 of the past control routine and currently the output is being changed, the control routine proceeds to step S47. At step S47, it is judged if the changes of the pump outputs have been completed. Whether the changes of the pump outputs have been completed is judged, for example, by whether the outputs P1, P2 of the pumps 31, 32 have reached the target outputs P1t, P2t. When at step S47 it is judged that the changes of the pump outputs have not been completed, the control routine proceeds to step S48. At step S48, the value obtained by adding the ΔP1 set at step S43, S45, or S46 of the past control routine to the previous output P1p of the first pump 31, is set to the output P1 of the first pump 31. However, if the calculated output P1 exceeds the target output P1t, the output P1 is set to the target output P1t. Similarly, the value obtained by adding the ΔP2 set at step S43, S45, or S46 of the past control routine to the previous output P2p of the second pump 32 is set to the output P2 of the second pump 32. However, if the calculated output P2 exceeds the target output P2t, the output P2 is set to the target output P2t.

On the other hand, if at step S47 it is judged that the change of the pump output has been completed, the control routine proceeds to step S49. At step S49, both of the output P1 of the first pump 31 and the output P2 of the second pump 32 are set to the target outputs P1t, P2t, and the control routine is ended.

Above, preferred embodiments according to the present invention were explained, but the present invention is not limited to these embodiments. Various corrections and changes may be made within the language of the claims.

The invention claimed is:

1. A cooling system mounted in a vehicle provided with a motor for driving the vehicle, an inverter for controlling the motor, and a battery for supplying electric power to the motor, the cooling system comprising:
   a radiator exchanging heat with the outside air;
   a first flow path connected to the radiator and having a first pump and a first heat exchanger exchanging heat with the inverter, wherein when the first pump is operating, a heat medium circulates through the radiator and the first heat exchanger;
   a second flow path connected to the radiator in parallel with the first flow path and having a second pump and a second heat exchanger exchanging heat with the battery, wherein when the second pump is operating, the heat medium circulates through the radiator and the second heat exchanger; and
   a control device controlling operations of the first pump and the second pump,
   wherein the control device controls the outputs of the first pump and the second pump so that when making the outputs of the first pump and the second pump both rise or when making the outputs of the first pump and the second pump both fall, the flow rate of the heat medium flowing through the first flow path becomes temporarily larger than the target flow rate.

2. The cooling system according to claim 1, wherein when making the outputs of the first pump and the second pump both rise, the control device raises the output of the first pump before raising the output of the second pump.

3. The cooling system according to claim 1, wherein when making the outputs of the first pump and the second pump both rise, the control device controls the outputs of the first pump and the second pump so that a rate of rise of the output of the first pump becomes faster than a rate of rise of the output of the second pump.

4. The cooling system according to claim 1, wherein when making the outputs of the first pump and the second pump both fall, the control device lowers the output of the second pump before lowering the output of the first pump.

5. The cooling system according to claim 1, wherein when making the outputs of the first pump and the second pump both fall, the control device controls the outputs of the first pump and the second pump so that a rate of fall of the output of the second pump becomes faster than a rate of fall of the output of the first pump.

6. The cooling system according to claim 1, wherein
the system further comprises a refrigeration circuit having a third heat exchanger making the refrigerant absorb heat to thereby make the refrigerant evaporate and cool the heat medium and configured so that the refrigerant circulates through the third heat exchanger to thereby realize a refrigeration cycle, and
the second flow path further has a third heat exchanger, and the second flow path is configured so that, when the second pump is operating, the heat medium circulates through the radiator, the second heat exchanger, and the third heat exchanger.

7. The cooling system according to claim 1, wherein the control device sets the output of the first pump based on the target flow rate of the heat medium at the first flow path and the target flow rate of the heat medium at the second flow path, and sets the output of the second pump based on the target flow rate of the heat medium at the first flow path and the target flow rate of the heat medium at the second flow path.

8. The cooling system according to claim 7, wherein the control device calculates the target flow rate of the heat medium at the first flow path, based on the temperature of the element of the inverter and the temperature of the heat medium flowing through the first flow path.

9. The cooling system according to claim 7, wherein the control device calculates the target flow rate of the heat medium at the second flow path, based on the temperature of the element of the battery and the temperature of the heat medium flowing through the second flow path.

* * * * *